United States Patent
Ohkubo

(10) Patent No.: US 11,498,534 B2
(45) Date of Patent: Nov. 15, 2022

(54) ELECTRIC BRAKE DEVICE

(71) Applicant: TOYOTA JIDOSHA KABUSHIKI KAISHA, Toyota (JP)

(72) Inventor: Masayasu Ohkubo, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 579 days.

(21) Appl. No.: 16/589,208

(22) Filed: Oct. 1, 2019

(65) Prior Publication Data

US 2020/0108807 A1 Apr. 9, 2020

(30) Foreign Application Priority Data

Oct. 4, 2018 (JP) .............................. JP2018-189240

(51) Int. Cl.
*F16D 55/226* (2006.01)
*B60T 8/17* (2006.01)
*B60T 1/06* (2006.01)
*F16D 65/18* (2006.01)
*B60T 13/74* (2006.01)
(Continued)

(52) U.S. Cl.
CPC .............. *B60T 8/17* (2013.01); *B60T 1/065* (2013.01); *B60T 13/741* (2013.01); *F16D 55/226* (2013.01); *F16D 65/18* (2013.01); *F16D 2121/24* (2013.01); *F16D 2125/40* (2013.01)

(58) Field of Classification Search
CPC .......... B60T 8/17; B60T 1/065; B60T 13/741; F16D 55/226; F16D 65/18; F16D 2121/24; F16D 2125/40; F16D 2055/0029; F16D 2066/003; F16D 2125/50; F16D 2127/06; F16D 2129/08; F16D 65/183
See application file for complete search history.

(56) References Cited

U.S. PATENT DOCUMENTS

2018/0099651 A1* 4/2018 Yogo ........................ B60T 7/107
2018/0162333 A1* 6/2018 Nakaoka ................. F16D 65/18
(Continued)

FOREIGN PATENT DOCUMENTS

CN          102582600 A    7/2012
JP          2003-202042 A  7/2003
(Continued)

*Primary Examiner* — David J Hlavka
(74) *Attorney, Agent, or Firm* — Sughrue Mion, PLLC

(57) ABSTRACT

An electric brake device installed on a vehicle, including: a rotary body to rotate with a wheel; a friction member to be pushed onto the rotary body; an actuator including an electric motor as a drive source to cause the friction member to be pushed onto the rotary body; and a controller to control a braking force generated by the electric brake device by controlling a supply current supplied to the electric motor, wherein the controller determines, by mutually different methods, a plurality of target supply current components each of which is a component of a target supply current as a target of the supply current, determines the target supply current by adding up the target supply current components, and changes contribution degrees of the respective target supply current components in the determination of the target supply current in accordance with a characteristic of the braking force to be generated.

10 Claims, 11 Drawing Sheets

(51) Int. Cl.
　　　*F16D 125/40*　　　(2012.01)
　　　*F16D 121/24*　　　(2012.01)

(56)　　　　　References Cited

U.S. PATENT DOCUMENTS

2018/0162334 A1* 6/2018 Masuda .................... B60T 8/72
2018/0194334 A1* 7/2018 Masuda .................. H02P 27/00

FOREIGN PATENT DOCUMENTS

| JP | 2017-052420 A | 3/2017 |
| JP | 2017-149320 A | 8/2017 |

\* cited by examiner

FIG.4

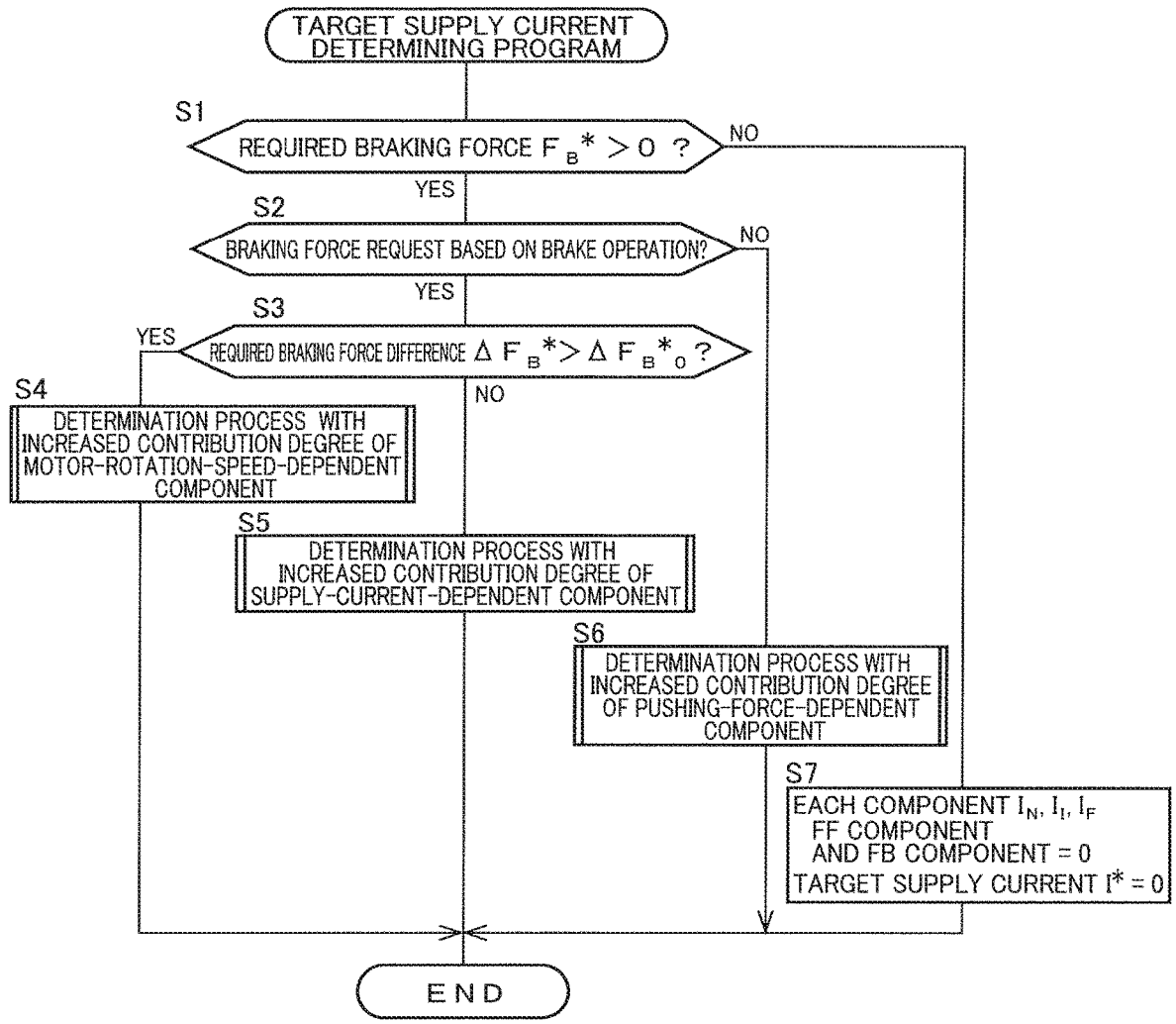

$I_N$ : MOTOR-ROTATION-SPEED-DEPENDENT COMPONENT
$I_I$: SUPPLY-CURRENT-DEPENDENT COMPONENT
$I_F$: PUSHING-FORCE-DEPENDENT COMPONENT

FF COMPONENT: FEEDFORWARD COMPONENT
  FF COMPONENT $I_{N-FF}$ of $I_N$   FF COMPONENT $I_{I-FF}$ of $I_I$   FF COMPONENT $I_{F-FF}$ of $I_F$

FB COMPONENT: FEEDBACK COMPONENT
  FB COMPONENT $I_{N-FB}$ of $I_N$   FB COMPONENT $I_{I-FB}$ of $I_I$   FB COMPONENT $I_{F-FB}$ of $I_F$

ELECTRIC BRAKE DEVICE

CROSS REFERENCE TO RELATED APPLICATION

The present application claims priority from Japanese Patent Application No. 2018-189240, which was filed on Oct. 4, 2018, the disclosure of which is herein incorporated by reference in its entirety.

BACKGROUND

Technical Field

The following disclosure relates to an electric brake device configured to generate a braking force by power of an electric motor.

Description of Related Art

An electric brake device is typically configured such that an electric current to be supplied to an electric motor (as a drive source for the electric brake device) is determined based on a braking force that should be generated by the electric brake device (hereinafter referred to as "required braking force" where appropriate). For instance, Japanese Patent Application Publication No. 2017-52420 discloses an electric brake device in which the following two methods are selectively used depending on situations for determining the supply current: a method of determining the supply current with emphasis on generating a torque of the electric motor to a maximum extent; and a method of determining the supply current with emphasis on making a torque variation of the electric motor small.

SUMMARY

Various methods of determining the supply current to the electric motor of the electric brake device have been studied, and there remains much room for improvement as to what methods are to be employed and how the methods are selectively used depending on situations. The utility of the electric brake device can be enhanced by the improvement. Accordingly, one aspect of the present disclosure is directed to an electric brake device having high utility.

One aspect of the present disclosure is directed to an electric brake device configured to determine, by mutually different methods, a plurality of target supply current components each of which is a component of a target supply current as a target of a supply current to be supplied to the electric motor, to determine the target supply current by adding up the determined target supply current components, and to change contribution degrees of the target supply current components in the determination of the target supply current in accordance with a characteristic of the braking force to be generated.

The electric brake device of the present disclosure enables easy generation of an appropriate braking force that meets the characteristic of the braking force to be generated, by changing the contribution degrees of the respective target supply current components that are to be added up.

Various Forms

There will be exemplified and explained various forms of the present disclosure. Each of the forms is numbered and depends from the other form or forms, where appropriate. This is for easier understanding of the present disclosure, and it is to be understood that combinations of constituent elements that constitute the present disclosure are not limited to those described in the following forms. That is, it is to be understood that the present disclosure shall be construed in the light of the following description of various forms and embodiments. It is to be further understood that, as long as the present disclosure is construed in this way, any form in which one or more constituent elements is/are added to or deleted from any one of the following forms may be considered as one form of the present disclosure.

(1) An electric brake device installed on a vehicle, including:

a rotary body to rotate with a wheel;

a friction member to be pushed onto the rotary body;

an actuator including an electric motor as a drive source to cause the friction member to be pushed onto the rotary body; and a controller to control a braking force generated by the electric brake device by controlling a supply current supplied to the electric motor, wherein the controller determines, by mutually different methods, a plurality of target supply current components each of which is a component of a target supply current as a target of the supply current, determines the target supply current by adding up the target supply current components, and changes contribution degrees of the respective target supply current components in the determination of the target supply current in accordance with a characteristic of the braking force to be generated.

This form is a basic form of the present disclosure. As later explained, there are various methods of determining the target supply current such as (a) a method in which a target motor rotation speed is determined based on a required braking force and the target supply current is determined based on the target motor rotation speed (hereinafter referred to as "motor-rotation-speed-dependent determining method" where appropriate), (b) a method in which a present target supply current is determined based on the most recently determined target supply current (hereinafter referred to as "supply-current-dependent determining method" where appropriate), and (c) a method in which a pushing force by which the friction member is pushed onto the rotary body is determined based on a braking force request and the target supply current is determined based on the pushing force (hereinafter referred to as "pushing-force-dependent determining method" where appropriate. The feature of the braking force to be generated by the electric brake device differs depending on which method is employed by the electric brake device to determine the target supply current. According to this form, the plurality of target supply current components determined by mutually different methods are added up so as to determine the target supply current, and the contribution degrees of the respective target supply current components are changed in the determination of the target supply current, whereby the feature of the braking force to be generated by the electric brake device can be changed.

In short, "the characteristic of the braking force to be generated" in this form is a concept as to what sort of the braking force the electric brake device should generate, specifically, whether the braking force required to be generated by the electric brake device (hereinafter referred to as "required braking force" where appropriate) is changing or not, how high the degree of change is in the case where the required braking force is changing, to what extent the braking force to be generated is required to be accurate, or the like. In this form, the contribution degrees of the respective target supply current components are changed in accordance with the characteristic of the braking force to be generated, resulting in easy generation of an appropriate braking force that meets the characteristic. In this respect, the "contribution degree" in this form may be considered as a concept that indicates how dominant a certain target supply current component is in the determination of the target supply current. The contribution degrees of the respective target supply current components are relative to each other.

(2) The electric brake device according to the form (1), wherein the target supply current components include:

a motor-rotation-speed-dependent component including a feedback component based on a motor rotation speed deviation that is a deviation of an actual rotation speed of the electric motor from a target motor rotation speed as a target of a rotation speed of the electric motor; and a supply-current-dependent component including a feedback component based on a supply current deviation that is a deviation of an actual supply current from the target supply current.

In this form, the plurality of target supply current components are specifically limited. In short, the motor-rotation-speed-dependent component in this form is considered as a component determined by the motor-rotation-speed-dependent determining method, and the supply-current-dependent component in this form is considered as a component determined by the supply-current-dependent determining method. By increasing the contribution degree of the motor-rotation-speed-dependent component, the braking force actually generated can adequately follow the change in the required braking force. By increasing the contribution degree of the supply-current-dependent component, the braking force to be generated can be stabilized in the case where the required braking force does not change. It is noted that each of the motor-rotation-speed-dependent component and the supply-current-dependent component may include a feedforward component in addition to the feedback component.

(3) The electric brake device according to the form (2), wherein the braking force required to be generated by the electric brake device is defined as a required braking force and a change in the required braking force is defined as a required braking force change,
wherein the controller increases the contribution degree of the motor-rotation-speed-dependent component in the determination of the target supply current when a degree of the required braking force change based on a brake operation by a driver of the vehicle becomes larger than a set degree, and wherein the controller increases the contribution degree of the supply-current-dependent component in the determination of the target supply current when the degree of the required braking force change based on the brake operation by the driver of the vehicle becomes equal to or smaller than the set degree.

According to this form, in the case where a driver performs a brake operation to change the braking force (such as depression of a brake pedal or depression return of the brake pedal), the electric brake device can generate the braking force that adequately follows the brake operation in question. On the other hand, in the case where the driver is performing a brake operation to maintain the braking force (such as an operation in which the amount of depression is maintained with the brake pedal depressed to a certain degree), the electric brake device can stably maintain the braking force being generated.

(4) The electric brake device according to the form (3), wherein the controller increases the contribution degree of the motor-rotation-speed-dependent component in the determination of the target supply current by keeping the feedback component of the supply-current-dependent component at a fixed value until the motor rotation speed deviation becomes larger than a set deviation, and wherein the controller increases the contribution degree of the supply-current-dependent component in the determination of the target supply current by keeping the feedback component of the motor-rotation-speed-dependent component at a fixed value until the supply current deviation becomes larger than a set deviation.

In this form, the way to change the contribution degrees is specifically limited. In short, keeping the feedback component at the fixed value means not to positively or actively utilize the feedback component. In this form, by not positively utilizing the feedback component of the supply-current-dependent component at an initial stage of a state in which the required braking force is changing, the motor-rotation-speed-dependent component whose feedback component is positively utilized functions dominantly in the determination of the target supply current. On the other hand, by not positively utilizing the feedback component of the motor-rotation-speed-dependent component at an initial stage of a state in which the required braking force is maintained, the supply-current-dependent component whose feedback component is positively utilized functions dominantly in the determination of the target supply current. From the viewpoint of preventing the braking force from abruptly changing when the degree of the required braking force change is changed across the set degree, the feedback component is preferably kept at the fixed value that is equal to a value immediately before the degree of the required braking force change is changed.

(5) The electric brake device according to the form (3), wherein the controller determines the target supply current by adding up the motor-rotation-speed-dependent component and the supply-current-dependent component after weights are assigned to the motor-rotation-speed-dependent component and the supply-current-dependent component, wherein the controller increases the contribution degree of the motor-rotation-speed-dependent component in the determination of the target supply current by changing the weights such that the motor-rotation-speed-dependent component is more largely weighted than the supply-current-dependent component, and wherein the controller increases the contribution degree of the supply-current-dependent component in the determination of the target supply current by changing the weights such that the supply-current-dependent component is more largely weighted than the motor-rotation-speed-dependent component.

In this form, the way to change the contribution degrees is specifically limited. One of the motor-rotation-speed-dependent component and the supply-current-dependent component is more largely weighted than the other of the motor-rotation-speed-dependent component and the supply-current-dependent component, so that the more largely weighted one of the motor-rotation-speed-dependent component and the supply-current-dependent component functions dominantly in the determination of the target supply current.

(6) The electric brake device according to the form (5), wherein the weights are changed so as to be gradually changed.

This form prevents an abrupt change of the braking force when the weights are changed. In other words, the braking force can be smoothly switched in accordance with the characteristic of the braking force to be generated.

(7) The electric brake device according to the form (2), wherein the target supply current components further include a pushing-force-dependent component including a feedback component based on a pushing force deviation that is a deviation of an actual pushing force from a target pushing force as a target of a pushing force by which the friction member is pushed onto the rotary body by the actuator.

According to this form, the target supply current component further includes the pushing-force-dependent component in addition to the motor-rotation-speed-dependent component and the supply-current-dependent component. In short, the pushing-force-dependent component in this form is considered as a component determined by the pushing-force-dependent determining method. By increasing the contribution degree of the pushing-force-dependent component, the electric brake device can generate the braking force that is comparatively accurate with respect to the required braking force. It is noted that the pushing-force-dependent component may include a feedforward component in addition to the feedback component.

(8) The electric brake device according to the form (7), wherein the braking force required to be generated by the electric brake device is defined as a required braking force and a change in the required braking force is defined as a required braking force change, wherein the controller increases the contribution degree of the motor-rotation-speed-dependent component in the determination of the target supply current when a degree of the required braking force change based on a brake operation by a driver of the vehicle becomes larger than a set degree, wherein the controller increases the contribution degree of the supply-current-dependent component in the determination of the target supply current when the degree of the required braking force change based on the brake operation by the driver of the vehicle becomes equal to or smaller than the set degree, and wherein the controller increases the contribution degree of the pushing-force-dependent component in the determination of the target supply current when a braking force request not based on the brake operation by the driver of the vehicle is made.

The "braking force request not based on the brake operation by the driver" in this form includes a braking force request made when an ABS function works in the case where the electric brake device has the ABS function, a braking force request made for automatic brake in instances such as automated or autonomous driving, collision avoidance with respect to an obstacle, and appropriate preceding-vehicle follow-up running. In such braking force requests, the braking force having an accurate magnitude needs to be generated. Thus, an increase of the contribution degree of the pushing-force-dependent component is suitable. In this respect, in the case where a regenerative brake device is additionally installed on the vehicle on which the present electric brake device is installed, the contribution degree of the pushing-force-dependent component may be increased in switching of the braking force between the braking force by the regenerative brake device and the braking force by the electric brake device.

(9) The electric brake device according to the form (8), wherein the controller increases the contribution degree of the motor-rotation-speed-dependent component in the determination of the target supply current by keeping the feedback components of the supply-current-dependent component and the pushing-force-dependent component at respective fixed values until the motor rotation speed deviation becomes larger than a set deviation, wherein the controller increases the contribution degree of the supply-current-dependent component in the determination of the target supply current by keeping the feedback components of the motor-rotation-speed-dependent component and the pushing-force-dependent component at respective fixed values until the supply current deviation becomes larger than a set deviation, and wherein the controller increases the contribution degree of the pushing-force-dependent component in the determination of the target supply current by keeping the feedback components of the motor-rotation-speed-dependent component and the supply-current-dependent component at respective fixed values until the pushing force deviation becomes larger than a set deviation.

In this from, the way to change the contribution degrees is specifically limited, as in the forms described above. The significance of keeping the feedback components at the respective fixed values is similar to that explained with respect to the forms described above, and its detailed explanation is dispensed with.

(10) The electric brake device according to the form (8), wherein the controller determines the target supply current by adding up the motor-rotation-speed-dependent component, the supply-current-dependent component, and the pushing-force-dependent component after weights are assigned to the motor-rotation-speed-dependent component, the supply-current-dependent component, and the pushing-force-dependent component, wherein the controller increases the contribution degree of the motor-rotation-speed-dependent component in the determination of the target supply current by changing the weights such that motor-rotation-speed-dependent component is more largely weighted than the supply-current-dependent component and the pushing-force-dependent component, wherein the controller increases the contribution degree of the supply-current-dependent component in the determination of the target supply current by changing the weights such that the supply-current-dependent component is more largely weighted than the motor-rotation-speed-dependent component and the pushing-force-dependent component, and wherein the controller increases the contribution degree of the pushing-force-dependent component in the determination of the target supply current by changing the weights such that the pushing-force-dependent component is more largely weighted than the motor-rotation-speed-dependent component and the supply-current-dependent component.

In this from, the way to change the contribution degrees is specifically limited, as in the forms described above. The pushing-force-dependent component is more largely weighted, whereby the pushing-force-dependent component functions dominantly in the determination of the target supply current.

(11) The electric brake device according to the form (10), wherein the weights are changed so as to be gradually changed.

Like the form described above, this form prevents the braking force from abruptly changing when the weights are changed. In other words, the braking force can be smoothly switched in accordance with the characteristic of the braking force to be generated.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 4 is a flowchart indicating a target supply current determining program executed in the electric brake device of the embodiment for determining a target supply current as a target of the supply current supplied to the electric motor;

DETAILED DESCRIPTION OF THE EMBODIMENT

Figure 1:
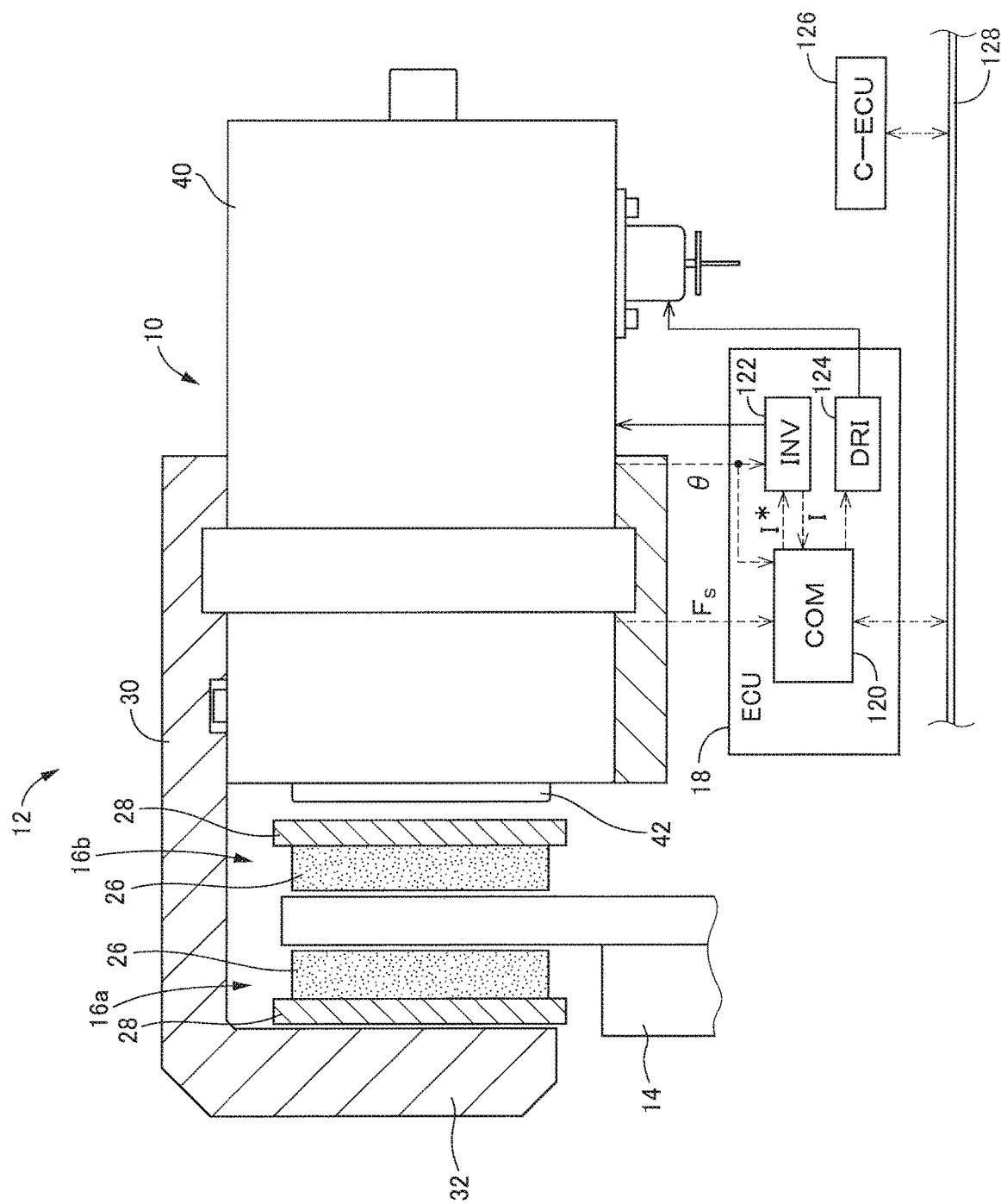
FIG. 1 is a view showing an overall structure of an electric brake device according to one embodiment.

Referring to the drawings, there will be explained below in detail an electric brake device according to one embodiment of the present disclosure and an electric brake device according to a modification. It is to be understood that the present disclosure is not limited to the details of the following embodiment and modification but may be embodied based on the forms described in Various Forms and may be changed and modified based on the knowledge of those skilled in the art.

A. Overall Structure of Electric Brake Device

As shown in FIG. 1, an electric brake device (hereinafter simply referred to as "brake device" where appropriate) according to the present embodiment includes: a brake caliper 12 (hereinafter simply referred to as "caliper 12" where appropriate) that holds an actuator 10; a disc rotor 14, as a rotary body, configured to rotate with a wheel; a pair of brake pads 16a, 16b (hereinafter simply referred to as "pad 16a" and "pad 16b" where appropriate); and an electronic control unit (ECU) 18, as a controller, which will be explained in detail.

The caliper 12 is held by a mount (not shown) provided on a carrier (not shown) that rotatably holds the wheel, such that the caliper 12 is movable in the axial direction, i.e., in the right-left direction in FIG. 1, and such that the caliper 12 straddles the disc rotor 14. The pads 16a, 16b are held by the mount so as to sandwich the disc rotor 14 therebetween in a state in which the pads 16a, 16b are movable in the axial direction. Each of the pads 16a, 16b includes: a friction member 26 disposed on one side thereof on which the pad 16a, 16b comes into contact with the disc rotor 14: and a backup plate 28 supporting the friction member 26. The friction member 26 of each pad 16a, 16b is configured to be pushed onto the disc rotor 14.

For the sake of convenience, a left side and a right side in FIG. 1 are defined as a front side and a rear side, respectively. The pad 16a located on the front side is supported by a front end portion (claw portion) 32 of a caliper main body 30. The actuator 10 is held by a rear-side portion of the caliper main body 30 such that a housing 40 of the actuator 10 is fixed to the rear-side portion of the caliper main body 30. The actuator 10 includes a piston 42 configured to advance and retract relative to the housing 40. When the piston 42 advances, a front end portion, specifically, a front end, of the piston 42 comes into engagement with the rear-side pad 16b, specifically, the backup plate 28 of the rear-side pad 16b. When the piston 42 further advances while being kept engaged with the backup plate 28 of the rear-side pad 16b, the pads 16a, 16b sandwich or nip the disc rotor 14 therebetween. In other words, the friction members 26 of the pads 16a, 16b are pushed onto the disc rotor 14. Owing to the pushing of the pads 16a, 16b, there is generated a braking force for stopping rotation of the wheel that depends on a friction force between the disc rotor 14 and the friction members 26, in other words, there is generated a braking force for reducing the speed of the vehicle or stopping the vehicle.

It may be possible to employ the actuator 10 as a constituent element of a caliper which is constructed such that one of the brake pads is fixed to or fixedly engaged with the front end portion of the piston and the other of the brake pads is fixed to the front end portion of the caliper main body.

B. Structure of Actuator

Figure 2:
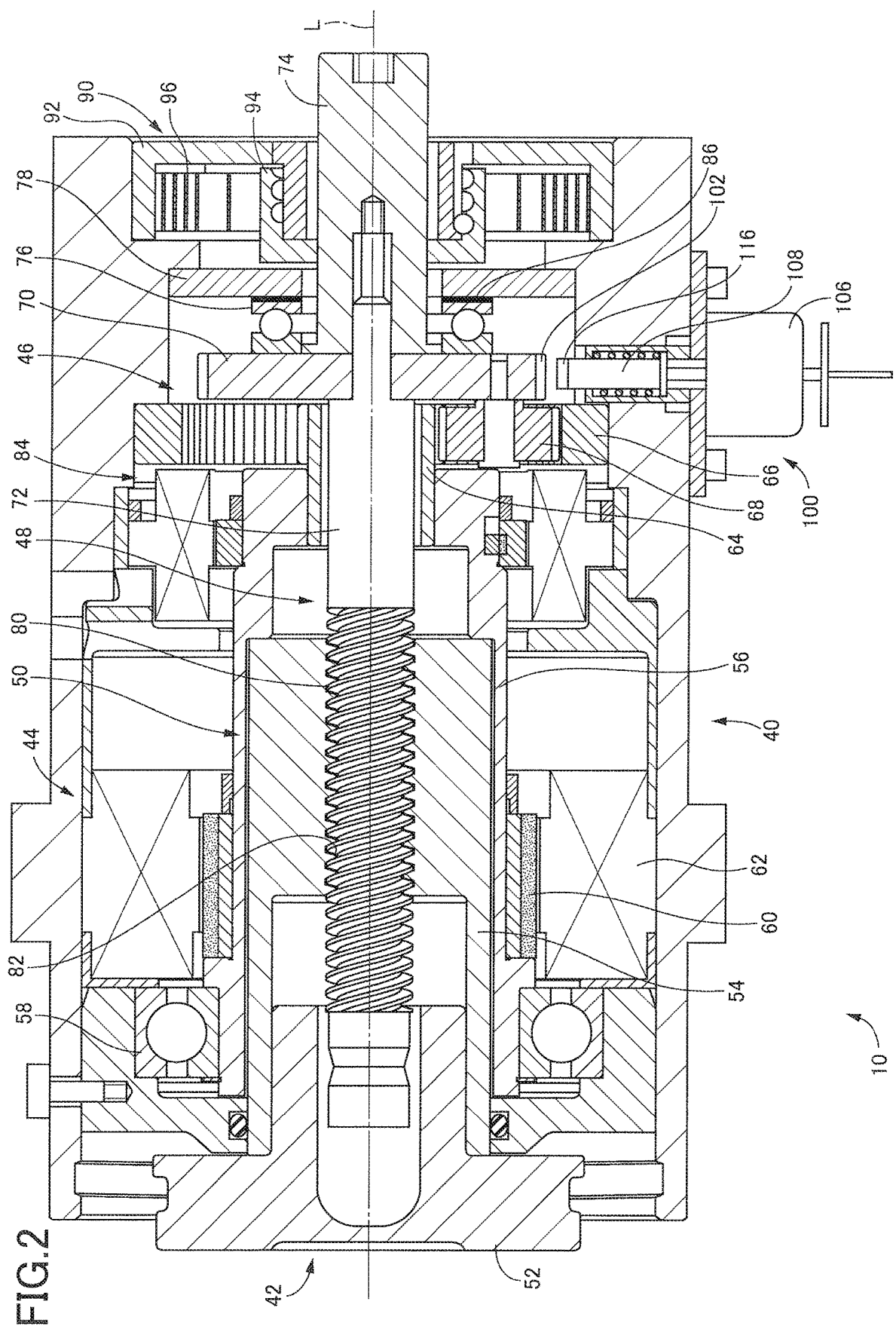
FIG. 2 is a cross-sectional view of an actuator of the electric brake device according to the embodiment.

As shown in FIG. 2, the actuator 10 includes the housing 40, the piston 42, an electric motor (three-phase DC brushless motor) 44 as a drive source, a speed reducer 46 for decelerating rotation of the electric motor 44, an input shaft 48 configured to be rotated by rotation of the electric motor 44 decelerated by the speed reducer 46, and a motion converting mechanism 50 configured to convert the rotating motion of the input shaft 48 into an advancing and retracting movement of the piston 42 (i.e., a forward and backward movement). In the following explanation, a left side and a right side in FIG. 2 are defined as a front side and a rear side, respectively, for the sake of convenience.

The piston 42 includes a piston head 52 and an output sleeve 54 which is a hollow cylindrical portion of the piston 42. The electric motor 44 includes a cylindrical rotary drive shaft 56. The output sleeve 54 is disposed in the rotary drive shaft 56, and the input shaft 48 is disposed in the output sleeve 54, such that the output shaft 54, the rotary drive shaft 56, and the input shaft 48 are coaxial relative to each other, specifically, such that respective axes of the rotary drive shaft 56, the output sleeve 54, and the input shaft 48 coincide with an axis L common thereto. Thus, the actuator 10 is compact in size.

The rotary drive shaft 56 is held by the housing 40 via a radial bearing 58 so as to be rotatable and immovable in an axial direction (which is a direction of extension of the axis L and which coincides with the right-left direction in FIG. 2). The electric motor 44 includes magnets 60 arranged on one circumference of an outer circumferential portion of the rotary drive shaft 56 and coils 62 fixed to an inner circumferential portion of the housing 40 so as to surround the magnets 60.

The speed reducer 46 is of a planetary gear type including a hollow sun gear 64 attached and fixed to a rear end of the rotary drive shaft 56, a ring gear 66 fixed to the housing 40, and a plurality of planetary gears 68 (only one of which is illustrated in FIG. 2) engaging with both the sun gear 64 and the ring gear 66 so as to revolve about the sun gear 64. Each of the plurality of planetary gears 68 is rotatably held by a flange 70 as a carrier. The input shaft 48 includes a front-side shaft 72 that constitutes a front-side portion of the input shaft 48 and a rear-side shaft 74 that constitutes a rear-side portion of the input shaft 48. The front-side shaft 72 and the rear-side shaft 74 are threadedly engaged with each other. The flange 70 is sandwiched between and fixed by the front-side shaft 72 and the rear-side shaft 74, whereby the flange 70 rotates together with the front-side shaft 72 and the rear-side shaft 74, namely, the flange 70 rotates together with the input shaft 48. The rotation of the rotary drive shaft 56, namely, the rotation of the electric motor 44, is decelerated by the speed reducer 46 and transmitted as the rotation of the input shaft 48. The input shaft 48 is held by the housing 40 via the flange 70, a thrust bearing 76, and a support plate 78, so as to be rotatable and immovable in the axial direction.

External threads 80 are formed on an outer circumferential portion of the front-side shaft 72 of the input shaft 48, and internal threads 82 which are threadedly engaged with the external threads 80 are formed in the output sleeve 54. That is, the input shaft 48 on which the external threads 80 are formed functions as a rotating member which is rotatable by the rotation of the electric motor 44, and the output sleeve 54 in which the internal threads 82 are formed functions as a linearly moving member which is advanceable and retractable for advancing and retracting the piston 42. The motion converting mechanism 50 is constituted by the input shaft 48 and the output sleeve 54. It may be considered that the linearly moving member and the piston are integral in the actuator 10.

A trapezoidal thread having relatively high strength is employed as each of the external threads 80 and the internal threads 82. There is provided, between the external threads 80 and the internal threads 82, grease as a lubricant for a smooth motion of the motion converting mechanism 50, namely, for a smooth motion of the actuator 10. The actuator 10 employs the motion converting mechanism in which the rotating member includes the external threads and the linearly moving member includes the internal threads. The actuator may employ a motion converting mechanism in which the rotating member includes the internal threads and the linearly moving member includes the external threads.

As apparent from the explanation, in the actuator 10, the rotation of the electric motor 44 causes the piston 42 to be advanced or retracted. FIG. 2 shows a state in which the piston 42 is positioned at the rearmost position in its movable range (hereinafter referred to as "set backward position" where appropriate). Specifically, when the electric motor 44 rotates forwardly from this state, the piston 42 is advanced, and as apparent from FIG. 1, the friction members 26 of the pads 16a, 16b are pushed onto the disc rotor 14 with the front end of the piston 42 held in engagement with the pad 16b, so that the braking force is generated. In this respect, the magnitude of the braking force corresponds to an electric current supplied to the electric motor 44. Subsequently, when the electric motor 44 rotates reversely, the piston 42 is retracted, and the piston 42 and the pad 16b are accordingly disengaged from each other, so that the braking force is not generated. Finally, the piston 42 returns to the set backward position shown in FIG. 2.

As is understood from the explanation above, the brake device of the present embodiment, which is the electric brake device, is configured such that the force generated by the electric motor 44 acts on the brake pads 16a, 16b, each as the friction member, directly (via the speed reducer 46 and the motion converting mechanism 50, actually) without using a working fluid such as a brake oil, so as to push the friction members 26 of the brake pads 16a, 16b onto the disc rotor 14 (as the rotary body) for generating the braking force. In short, the brake device is configured to generate the braking force that directly depends on the force generated by the electric motor 44. In this respect, the friction member 26 of each of the pads 16a, 16b may be regarded as an elastic member. The friction members 26 are elastically deformed by an amount corresponding to the braking force that is being generated.

In addition to the constituent components described above, the actuator 10 includes a resolver 84 for detecting a rotation angle of the electric motor 44. The resolver 84 functions as a motor rotation angle sensor. Based on a detection signal of the resolver 84, the position and the movement amount of the piston 42 in the axial direction, specifically, the rotational position of the input shaft 48, can be detected. Further, there is disposed, between the support plate 78 and the thrust bearing 76, an axial-force sensor 86 (as a load cell) for detecting a force in a thrust direction acting on the input shaft 48, namely, an axial force (axial load). The axial force corresponds to a pushing force by which the piston 42 pushes the friction members 26 of the brake pads 16a, 16b onto the disc rotor 14. In the present brake device, the pushing force can be detected based on a detection value of the axial-force sensor 86, and the braking force being generated by the brake device can be detected based on the pushing force.

In the present actuator 10, the negative efficiency of the motion converting mechanism 50 is not so high as compared with the positive efficiency thereof. That is, even when the force to retract the piston 42 acts on the piston 42, the input shaft 48 does not easily rotate. In the case where supply of the electric current to the electric motor 44 is cut off, for instance, in a state in which the piston 42 has been advanced and the braking force is being generated, the piston 42 cannot be easily retracted. In this case, it is expected that the braking force is kept generated. In view of such a case, the actuator 10 includes a mechanism for biasing the piston 42 in a direction in which the piston 42 is retracted by an elastic force exerted by an elastic member. Specifically, the actuator 10 includes a piston biasing mechanism 90 configured to give, to the input shaft 48, a rotational biasing force (which may be referred to as a "rotational torque") in the direction in which the piston 42 is retracted.

Specifically, the piston biasing mechanism 90 is constituted by an outer ring 92 fixed to the housing 40, an inner ring 94 fixed to the rear-side shaft 74 of the input shaft 48 so as to rotate therewith and disposed on an inner side of the outer ring 92, and a spiral spring 96 as the elastic member disposed between an inner circumferential surface of the outer ring 92 and an outer circumferential surface of the inner ring 94. The spiral spring 96 gives the input shaft 48 the rotational biasing force in the direction in which the piston 42 is retracted. The rotational biasing force enables the piston 42 to be easily retracted. For instance, even in the case where the piston 42 cannot be retracted by the electric motor 44 in the state in which the piston 42 has been advanced and the braking force is being generated, the piston 42 can be retracted by the rotational biasing force. In a strict sense, when the electric motor 44 generates the braking force, the electric motor 44 is required to generate a torque large enough to advance the piston 42 against the rotational biasing force of the spiral spring 96.

In the brake device, a piston-retracting prohibiting mechanism 100 is provided in the actuator 10. The piston-retracting prohibiting mechanism 100 is configured to prohibit the piston 42 from being retracted in the state in which the piston 42 has been advanced, for permitting the brake device to exert a function as an electric parking brake. In short, ratchet teeth 102 are formed on the periphery of the flange 70. When a locking rod 108 is advanced by an electromagnetic solenoid 106, a pawl 116 formed at a distal end of the locking rod 108 comes into engagement with the ratchet teeth 102. Thus, the piston 42 is prohibited from being retracted.

C. Structure of Controller

As shown in FIG. 1, the ECU 18 as a controller includes a computer (microcomputer) 120 including a CPU, a ROM, a RAM, an I/O, etc., an inverter 122 as a drive circuit for the electric motor 44, and a driver 124 as a drive circuit for the electromagnetic solenoid 106. A signal as to a rotation angle θ of the electric motor 44 detected by the resolver 84 is input to the inverter 122 for phase switching in electric current supply to the electric motor 44 and is input to the computer 120 for grasping a rotation speed $N_M$ of the electric motor 44, a piston position S of the piston 42, etc. A signal as to an axial force, i.e., a pushing force $F_S$, detected by the axial-force sensor 86 is also input to the computer 120.

As later explained in detail, the computer 120 determines a target supply current I* that should be supplied to the electric motor 44. The computer 120 transmits, to the inverter 122, a command as to the target supply current I*. On the other hand, the inverter 122 transmits, to the computer 120, a signal as to a supply current I being actually supplied. A command for activating the electromagnetic solenoid 106 is also transmitted from the computer 120 to the driver 124.

The electric brake device generates the braking force for one wheel and constitutes a part of a vehicle brake system that is configured to generate the braking force for the vehicle as a whole including the braking force for the other wheels. The brake system is controlled by a central electronic control unit (hereinafter referred to as "central ECU" where appropriate) 126 as a central controller. Under control of the central ECU 126, the ECU 18 executes control of the braking force for the one wheel. Accordingly, the ECU 18 is connected to the central ECU 126 via a car area network or controllable area network (CAN) 128.

The central ECU 126 determines the braking force required for the vehicle as a whole based on a brake operation amount by the driver, namely, an operation amount of a brake pedal as a brake operation member. Based on the determined braking force, the central ECU 126 determines the braking force required by each wheel. Further, the central ECU 126 determines the braking force required by each wheel that is not based on the brake operation, in response to a braking force request made in automated or autonomous driving, a request from anti-lock or anti-skid control (ABS control), traction control (TRC control), vehicle stability control (VSC control) or the like. A command as to the braking force required to be generated for the wheel, for which the electric brake device is provided, is transmitted to the ECU 18 via the CAN 128, and the ECU 18 controls the actuator 10 based on the command.

D. Control of Braking Force by Controller

The ECU 18 as the controller controls the supply current I to the electric motor 44 to thereby control a braking force $F_B$ to be generated by the electric brake device. Specifically, the computer 120 determines the target supply current I* as a target of the supply current I based on a required braking force $F_B^*$ that is the braking force $F_B$ required to be generated by the electric brake device. The inverter 122 supplies electric current I to the electric motor 44 based on the determined target supply current I*. The required braking force $F_B^*$ may also be referred to as "necessary braking force $F_B^*$". Hereinafter, the relationship among the supply current I, the motor rotation speed $N_M$ that is the rotation speed of the electric motor 44, the pushing force $F_S$ that is the force by which the friction members 26 of the brake pads 16a, 16b are pushed onto the disc rotor 14, and the braking force $F_B$ to be generated by the electric brake device will be first explained, and control of the braking force $F_B$ in the electric brake device will be next explained focusing on a determination process of determining the target supply current I*.

i) Relationship Among Supply Current, Motor Rotation Speed, Pushing Force of Brake Pad, and Braking Force In the electric brake device, the braking force $F_B$ to be generated is proportional to the pushing force $F_S$. Where a coefficient based on a friction coefficient between the friction member 26 and the disc rotor 14 is defined as a conversion coefficient α, the following formula (1) holds:

$$F_B = \alpha \cdot F_S \tag{1}$$

Where the position of the piston 42 with respect to its position (i.e., reference position) at the time when the friction members 26 come into contact with the disc rotor 14 is defined as a piston position S and the rigidity of the friction members 26 of the pads 16a, 16b is defined as pad rigidity k, the pushing force $F_S$ is represented by the following formula (2):

$$F_S = k \cdot S \tag{2}$$

Here, the piston position S may be considered as an amount of the advancing movement of the piston from the reference position and also as an amount of elastic deformation of the friction members 26 of the brake pads 16a, 16b.

The pushing force $F_S$ is represented by the following formula (3) in relation to the motion converting mechanism 50. Specifically, where the lead of the external threads 80 formed on the input shaft 48 (i.e., the movement amount of the piston 42 per one rotation of the input shaft 48) is defined as thread lead $L_E$, the torque of the input shaft 48 is defined as a gear torque $T_G$, and the efficiency of the motion converting mechanism 50 is defined as thread efficiency μ, the pushing force $F_S$ is represented by the following formula (3):

$$F_S = \mu \cdot (2\pi/L_E) \cdot T_G \quad (3)$$

Where the rotation speed of the input shaft 48 is defined as an input shaft rotation speed $N_G$, the moving speed of the piston 42 is defined as a piston speed dS/dt, and the change gradient of the pushing force $F_S$ is defined as a pushing force gradient $dF_S/dt$, the relationship among them is represented by the following formula (4) based on the above formulas (1)-(3):

$$dS/dt = (dF_S/dt)/k = (L_E/2\pi) \cdot N_G \quad (4)$$

Where the speed reduction ratio of the speed reducer 46 is defined as a speed reduction ratio n, the relationship between the gear torque $T_G$ and a motor torque $T_M$ that is the torque of the electric motor 44 is represented by the following formula (5), and the relationship between the input shaft rotation speed $N_G$ and the motor rotation speed $N_M$ that is the rotation speed of the rotary drive shaft 56 of the electric motor 44 is represented by the following formula (6):

$$T_G = n \cdot T_M \quad (5)$$

$$N_G = N_M/n \quad (6)$$

The motor torque $T_M$ is obtained from the supply current I according to the following formula (7) based on a torque constant $k_t$ of the electric motor 44:

$$T_M = k_t \cdot I \quad (7)$$

Figure 3A:
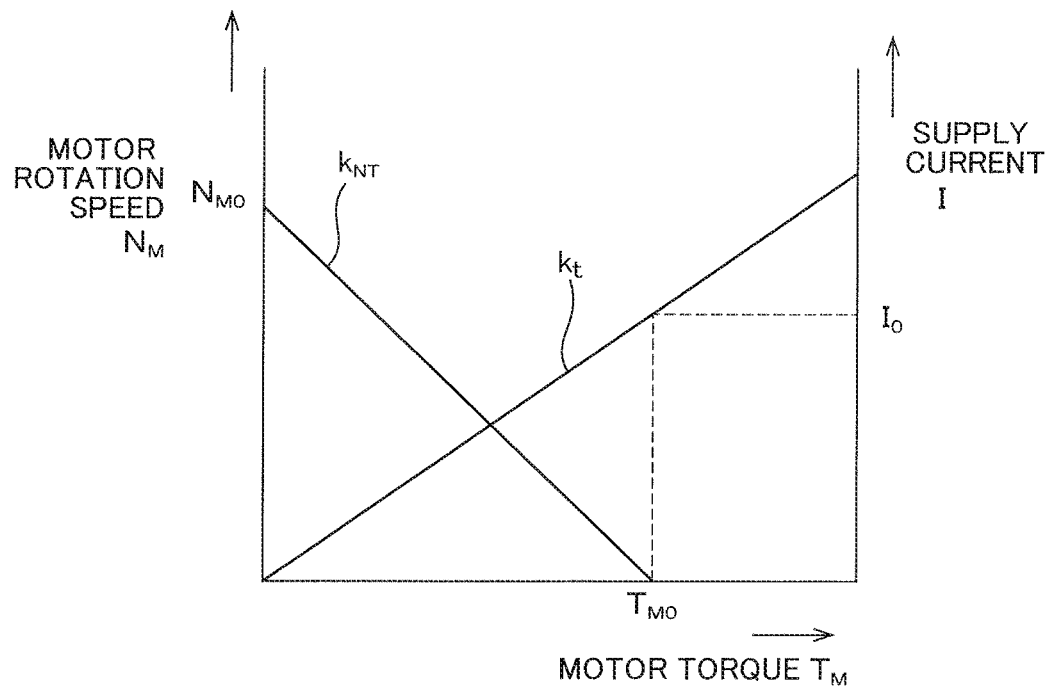
FIG. 3A is a graph showing a characteristic between a torque and a rotation speed of an electric motor and FIG. 3B is a graph showing a relationship between a supply current supplied to the electric motor and a pushing force by which a friction member is pushed onto a rotary body that rotates with a wheel.

The electric motor 44 has characteristics shown in a graph of FIG. 3A, i.e., characteristics between the torque and the rotation speed. In the graph, "$N_{M0}$" and "$T_{M0}$" respectively represent a no-load rotation speed and a lock torque when a certain electric current $I_0$ is supplied to the electric motor 44. The lock torque is a maximum torque generated in a state in which the electric motor is not rotated. In this respect, a N-T gradient $k_{NT}$, which is a gradient of a line connecting the no-load rotation speed $N_{M0}$ and the lock torque $T_{M0}$, is nearly constant irrespective of the electric current $I_0$ supplied to the electric motor 44. Based on the characteristics, the motor rotation speed $N_M$ is represented by the following formula (8), and the lock torque $T_{M0}$ is represented by the following formula (9) based on the above formula (7):

$$N_M = N_{M0} - k_{NT} \cdot T_M \quad (8)$$

$$T_{M0} = k_t \cdot I_0 \quad (9)$$

ii) Three Components of Target Supply Current

In the present electric brake device, the target supply current I* is determined by adding up three components that are determined by mutually different methods. Hereinafter, the three components, namely, three target supply current components, will be explained. As later explained in detail, the target supply current I* is repeatedly determined at a considerably short time pitch, and the three components are also repeatedly determined at the same time pitch.

ii-a) Motor-Rotation-Speed-Dependent Component

A motor-rotation-speed-dependent component $I_N$ is a component determined by the motor-rotation-speed-dependent determining method. In short, the motor-rotation-speed-dependent component $I_N$ is a component determined by a method in which a target motor rotation speed $N_M^*$ is determined based on the change gradient of the required braking force $F_B^*$ that is the braking force $F_B$ required to be generated by the electric brake device, and the target supply current I* is determined based on the target motor rotation speed $N_M^*$. The motor-rotation-speed-dependent component $I_N$ is determined by adding a feedforward component $I_{N-FF}$ and a feedback component $I_{N-FB}$.

The feedforward component $I_{N-FF}$ is determined according to the following process. Initially, the target pushing force $F_S^*$ is determined based on the required braking force $F_B^*$ according to the above formula (1), and a target pushing force change gradient $dF_S^*/dt$, which is a change gradient of the target pushing force $F_S^*$, is identified based on the change gradient of the required braking force $F_B^*$. Next, according to the following formulas (10), (11) derived from the relationships explained above, a necessary torque $T_M^*$ that is the motor torque $T_M$ required for the electric motor 44 is estimated based on the target pushing force $F_S^*$, and the target motor rotation speed $N_M^*$ is determined. Subsequently, the lock torque $T_{M0}$ is identified according to the following formula (12) based on the N-T gradient $k_{NT}$, the necessary torque $T_M^*$, and the target motor rotation speed $N_M^*$ of the electric motor 44, and the feedforward component $I_{N-FF}$ is determined according to the following formula (13) based on the lock torque $T_{M0}$ and the torque constant $k_t$ of the electric motor 44:

$$T_M^* = \{L_E/(2\pi \cdot \mu \cdot n)\} \cdot F_S \quad (10)$$

$$N_M^* = \{2\pi \cdot n/(L_E - k)\} \cdot (dF_S^*/dt) \quad (11)$$

$$T_{M0} = N_M^*/k_{NT} + T_M^* \quad (12)$$

$$I_{N-FF} = T_{M0}/k_t \quad (13)$$

The feedback component $I_{N-FB}$ is determined, in principle, according to the following formula (14) based on a motor rotation speed deviation ($N_M^* - N_M$) that is a deviation of an actual motor rotation speed $N_M$ from the target motor rotation speed $N_M^*$. It is noted that "$k_{PN}$", "$k_{DN}$", and "$k_{IN}$" in the formula (14) are a proportional term gain, a derivative term gain, and an integral term gain, respectively.

$$I_{N-FB} = k_{PN} \cdot (N_M^* - N_M) + k_{DN} \cdot (dN_M^*/dt - dN_M/dt) + k_{IN} \cdot \int (N_M^* - N_M) dt \quad (14)$$

The feedforward component $I_{N-FF}$ and the feedback component $I_{N-FB}$ determined as described above are added together according to the following formula (15) so that the motor-rotation-speed-dependent component $I_N$ is determined.

$$I_N = I_{N-FF} + I_{N-FB} \quad (15)$$

ii-b) Supply-Current-Dependent Component

A supply-current-dependent component $I_I$ is a component determined by the supply-current-dependent determining method. In short, the supply-current-dependent component $I_I$ is determined by a method of determining a present target supply current I* based on the most recently determined one of the target supply currents I* that are repeatedly determined. The supply-current-dependent component $I_I$ is determined by adding a feedforward component $I_{I-FF}$ and a feedback component $I_{I-FB}$.

The feedforward component $I_{I-FF}$ is determined to be a previous target supply current $I^{P*}$ that is the most recently determined target supply current I*. In other words, the value of the previous target supply current $I^{*P}$ is employed as the value of a present feedforward component $I_{I-FF}$.

The feedback component $I_{I-FB}$ is determined, in principle, according to the following formula (16) based on a supply current deviation ($I^{*P}-I$) that is a deviation of an actual supply current I from the previous target supply current I*P. It is noted that "$k_{PI}$" "$k_{DI}$", and "$k_{II}$" in the formula (16) are a proportional term gain, a derivative term gain, and an integral term gain, respectively.

$$I_{I-FB}=k_{PI}\cdot(I^{*P}-I)+k_{DI}\cdot(dI^{*P}/dt-dI/dt)+k_{II}\cdot\int(I^{*P}-I)dt \quad (16)$$

The feedforward component $I_{I-FF}$ and the feedback component $I_{I-FB}$ determined as described above are added together according to the following formula (17) so that the supply-current-dependent component $I_I$ is determined.

$$I_I=I_{I-FF}+I_{I-FB} \quad (17)$$

ii-c) Pushing-Force-Dependent Component

A pushing-force-dependent component $I_F$ is a component determined by the pushing-force-dependent determining method. In short, the pushing-force-dependent component $I_F$ is a component determined by a method in which the target pushing force $F_S*$ as a target of the pushing force $F_S$ by which the friction members 26 are pushed onto the disc rotor 14 is determined based on the required braking force $F_B*$, and the target supply current I* is determined based on the target pushing force $F_S*$. The pushing-force-dependent component $I_F$ is determined by adding a feedforward component $I_{F-FF}$ and a feedback component $I_{F-FB}$.

Figure 3B:
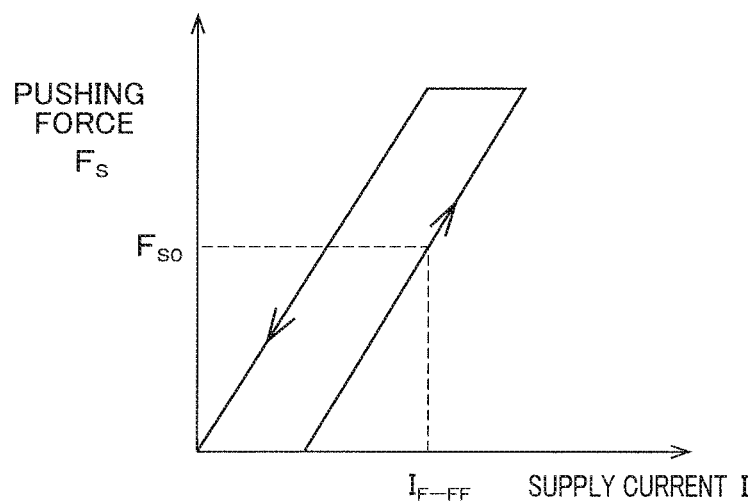

Though the relationship between the pushing force $F_S$ and the supply current I to the electric motor 44 is explained above, hysteresis shown in a graph of FIG. 3B is actually exhibited due to factors such as provision of the piston biasing mechanism 90 of the actuator 10, a difference between positive efficiency and negative efficiency of the motion converting mechanism 50, etc. The computer 120 of the ECU 18 stores map data in which the supply current I and the pushing force $F_S$ are related to each other. Based on the map data, the supply current I corresponding to the target pushing force $F_S*$ is determined as the feedforward component $I_{F-FF}$. As apparent from the graph of FIG. 3A, the supply current I takes different values in the increasing process and the decreasing process of the pushing force $F_S$.

The feedback component $I_{F-FB}$ is determined, in principle, according to the following formula (18) based on a pushing force deviation ($F_S*-F_S$) that is a deviation of an actual pushing force $F_S$ (based on the detection result by the axial-force sensor 86) from the target pushing force $F_S*$. It is noted that "$k_{PF}$" "$k_{DF}$", and "$k_{IF}$" in the formula (18) are a proportional term gain, a derivative term gain, and an integral term gain, respectively.

$$I_{F-FB}=k_{PF}\cdot(F_S*-F_S)+k_{DF}\cdot(dF_S*/dt-dF_S/dt)+k_{IF}\cdot\int(F_S*-F_S)dt \quad (18)$$

The feedforward component $I_{F-FF}$ and the feedback component $I_{F-FB}$ are added together according to the following formula (19), so that the pushing-force-dependent component $I_F$ is determined.

$$I_F=I_{F-FF}+I_{F-FB} \quad (19)$$

iii) Adding Up of Three Components and Contribution Degrees Thereof

For determining the target supply current I*, the motor-rotation-speed-dependent component $I_N$, the supply-current-dependent component $I_I$, and the pushing-force-dependent component $I_F$ are added up according to the following formula (20). It is noted that "$k_N$" "$k_I$", and "$k_F$" in the formula (20) are a motor rotation speed gain $k_N$ as a gain for the motor-rotation-speed-dependent component $I_N$, a supply current gain $k_I$ as a gain for the supply-current-dependent component $I_I$, and a pushing force gain $k_F$ as a gain for the pushing-force-dependent component $I_F$, respectively, and the following formula (21) holds for the three gains. That is, the motor rotation speed gain $k_N$, the supply current gain $k_I$, and the pushing force gain $k_F$ function as weighting coefficients in adding up of the motor-rotation-speed-dependent component $I_N$, the supply-current-dependent component $I_I$, and the pushing-force-dependent component $I_F$. In the electric brake device according to the present embodiment, the motor rotation speed gain $k_N$, the supply current gain $k_I$, and the pushing force gain $k_F$ are set to respective fixed values, specifically, set to the same value, for instance.

$$I*=k_N\cdot I_N+k_I\cdot I_I+k_F\cdot I_F \quad (20)$$

$$k_N+k_I+k_F=1 \quad (21)$$

As explained above, the motor-rotation-speed-dependent component $I_N$, the supply-current-dependent component $I_I$, and the pushing-force-dependent component $I_F$ are determined by mutually different methods, and the characteristic of the braking force $F_B$ to be generated differs depending on the contribution degrees of the respective components in the determination of the target supply current I*. In other words, the characteristic of the electric brake device differs depending on which one of the motor-rotation-speed-dependent component $I_N$, the supply-current-dependent component $I_I$, and the pushing-force-dependent component $I_F$ is treated dominantly in the determination of the target supply current I*.

Specifically, by increasing the contribution degree of the motor-rotation-speed-dependent component $I_N$, the followability of the braking force $F_B$ that is actually generated is enhanced with respect to the change in the braking force $F_B$ to be required, in other words, with respect to the change in the required braking force $F_B*$. By increasing the contribution degree of the supply-current-dependent component $I_I$, the braking force $F_B$ can be stabilized in the case where the required braking force $F_B*$ does not change, that is, in the case where the braking force $F_B$ should be maintained at a certain constant value. By increasing the contribution degree of the pushing-force-dependent component $I_F$, the electric brake device can generate the braking force $F_B$ that is comparatively accurate with respect to the required braking force $F_B*$.

iv) Changing of Contribution Degrees of Target Supply Current Components in Accordance with Characteristic of Braking Force to Be Generated As explained above, the characteristic of the braking force to be generated by the present electric brake device can be changed by changing the contribution degrees of the motor-rotation-speed-dependent component $I_N$, the supply-current-dependent component $I_I$, and the pushing-force-dependent component $I_F$. In the present electric brake device, the contribution degrees of the motor-rotation-speed-dependent component $I_N$, the supply-current-dependent component $I_I$, and the pushing-force-dependent component $I_F$ are changed depending on the characteristic of the braking force to be generated, namely, depending on what sort of the braking force should be generated by the electric brake device.

iv-a) Case in Which Change of Required Braking Force is Large

In the case where the driver performs a brake operation such as depression of the brake pedal or depression return of the brake pedal, for instance, the required braking force $F_B^*$ relatively largely changes. In such a case, the electric brake device is required to generate the braking force that adequately follows the operation in question. In view of this, the contribution degree of the motor-rotation-speed-dependent component $I_N$ is increased in the determination of the target supply current $I^*$. In other words, the contribution degree of the supply-current-dependent component $I_I$ and the contribution degree of the pushing-force-dependent component $I_F$ are relatively decreased. Specifically, when a required braking force difference $\Delta F_B^*$, which is a difference between the required braking force $F_B^*$ in previous determination of the target supply current $I^*$ and the required braking force $F_B^*$ in present determination of the target supply current $I^*$, is larger than a set difference $\Delta F_B^*_0$, it is determined that the degree of the required braking force change is larger than the set degree, and the contribution degree of the motor-rotation-speed-dependent component $I_N$ is increased. In this respect, the state in which the required braking force difference $\Delta F_B^*$ based on the brake operation is larger than the set difference $\Delta F_B^*_0$ will be hereinafter referred to as "required-braking-force changing state" where appropriate.

iv-b) Case in Which Change of Required Braking Force is Small

In the case where the driver is performing a brake operation in which the brake pedal is depressed in a certain amount and the amount of depression is maintained, it is desirable that the braking force $F_B$ to be generated be stable. In view of this, the contribution degree of the supply-current-dependent component $I_I$ is increased in the determination of the target supply current I. In other words, the contribution degree of the motor-rotation-speed-dependent component $I_N$ and the contribution degree of the pushing-force-dependent component $I_F$ are relatively lowered. Specifically, when the required braking force difference $\Delta F_B^*$, which is a difference between the required braking force $F_B^*$ in the previous determination of the target supply current $I^*$ and the required braking force $F_B^*$ in the present determination of the target supply current $I^*$, is equal to or smaller than the set difference $\Delta F_B^*_0$, it is determined that the degree of the required braking force change is equal to or smaller than the set degree, and the contribution degree of the supply-current-dependent component $I_I$ is increased. In this respect, the state in which the required braking force difference $\Delta F_B^*$ based on the brake operation is equal to or smaller than the set difference $\Delta F_B^*_0$ will be hereinafter referred to as "required-braking-force maintaining state" where appropriate. It is noted that a state in which the brake operation is not performed is regarded as the required-braking-force maintaining state.

iv-c) Case in Which Braking Force Request Not Based on Brake Operation Is Made

In the case where a braking force request is made when the ABS function is exerted in an instance in which the electric brake device has the ABS function and in the case where there is made a braking force request for automatic brake in instances such as automated or autonomous driving, collision avoidance with respect to an obstacle, and appropriate preceding-vehicle follow-up running, it is desirable that the electric brake device generate the braking force $F_B$ whose magnitude is accurate. In view of this, the contribution degree of the pushing-force-dependent component $I_F$ is increased in the determination of the target supply current $I^*$. In other words, the contribution degree of the motor-rotation-speed-dependent component $I_N$ and the contribution degree of the supply-current-dependent component $I_I$ are relatively lowered. Whether the braking force request not based on the brake operation has made or not is judged based on a command from the central ECU 126. In this respect, the state in which the braking force request not based on the brake operation is made will be hereinafter referred to as "non-brake-operation braking force requesting state" where appropriate.

Hereinafter, each of the three states explained above, i.e., the required-braking-force changing state, the required-braking-force maintaining state, and the non-brake-operation braking force requesting state, is generally referred to as "braking-force generating state". The characteristic of the braking force to be generated differs depending on the three states.

v) Way to Change Contribution Degrees

As explained above, the motor-rotation-speed-dependent component $I_N$ includes the feedforward component $I_{N-FF}$ and the feedback component $I_{N-FB}$, the supply-current-dependent component $I_I$ includes the feedforward component $I_{I-FF}$ and the feedback component $I_{I-FB}$, and the pushing-force-dependent component $I_F$ includes the feedforward component $I_{F-FF}$ and the feedback component $I_{F-FB}$. In the present electric brake device, when increasing the contribution degree of one of the three components $I_N$, $I_I$, $I_F$, the feedback components of the other two of the three components are kept at respective fixed values. Here, the component whose contribution degree is to be increased is referred to as a high contribution-degree component. In the present electric brake device, the feedback components of the respective two components other than the high contribution-degree component are not actively or positively utilized. Specifically, when any one of the three states indicated above (i.e., the required-braking-force changing state, the required-braking-force maintaining state, and the non-brake-operation braking force requesting state) is switched to another state that is defined as a present state, the feedback components of the two of the three components other than the one of the three components whose contribution degree should be increased in the present state are kept at respective values before the state switching. In the state switching, these feedback components are thus kept at the respective values, so that the feedback components of the two components other than the high contribution-degree component are not positively utilized at an initial stage of the present state. As a result, the feedback component of the high contribution-degree component is relatively positively utilized, so that the high contribution-degree component works dominantly in the determination of the target supply current I*.

Keeping the feedback components of the two components other than the high contribution-degree component at the respective values before the state switching is effective for obviating an abrupt change in the target supply current I* at the time of the state switching, namely, an abrupt change in the braking force $F_B$ to be generated. It is noted that the feedback components are kept at the respective values until the deviation that is relied on when determining the feedback component of the high contribution-degree component becomes larger than a set deviation. Specifically, In the case where the high contribution-degree component is the motor-rotation-speed-dependent component $I_N$, the feedback components of the supply-current-dependent component $I_I$ and the pushing-force-dependent component $I_F$ are kept at the respective values until the motor rotation speed deviation $(N_M^*-N_M)$ becomes larger than a set deviation. In the case where the high contribution-degree component is the supply-current-dependent component $I_I$, the feedback components of the motor-rotation-speed-dependent component $I_N$ and the pushing-force-dependent component $I_F$ are kept at the respective values until the supply current deviation $(I^{*P}-I)$ becomes larger than a set deviation. In the case where the high contribution-degree component is the pushing-force-dependent component $I_F$, the feedback components of the motor-rotation-speed-dependent component $I_N$ and the supply-current-dependent component $I_I$ are kept at the respective values until the pushing force deviation $(F_S^*-F_S)$ becomes larger than a set deviation.

Changing the contribution degrees of the motor-rotation-speed-dependent component $I_N$, the supply-current-dependent component $I_I$, and the pushing-force-dependent component $I_F$ will be more specifically explained. When the braking-force generating state is switched to the required-braking-force changing state, the value of the feedback component $I_{I-FB}$ of the supply-current-dependent component $I_I$ is kept at a previously determined value of the feedback component $I_{I-FB}^P$ and the value of the feedback component $I_{F-FB}$ of the pushing-force-dependent component $I_F$ is kept at a previously determined value of the feedback component $I_{F-FB}^P$ until the motor rotation speed deviation $(N_M^*-N_M)$ becomes larger than the set deviation $\Delta N_{M0}$. When the braking-force generating state is switched to the required-braking-force maintaining state, the value of the feedback component $I_{N-FB}$ of the motor-rotation-speed-dependent component $I_N$ is kept at a previously determined value of the feedback component $I_{N-FB}^P$ and the value of the feedback component $I_{F-FB}$ of the pushing-force-dependent component $I_F$ is kept at a previously determined value of the feedback component $I_{F-FB}^P$ until the supply current deviation $(I^{*P}-I)$ becomes larger than the set deviation $\Delta I_0$. When the braking-force generating state is switched to the non-brake-operation braking force requesting state, the value of the feedback component $I_{N-FB}$ of the motor-rotation-speed-dependent component $I_N$ is kept at a previously determined value of the feedback component $I_{N-FB}^P$ and the value of the feedback component $I_{I-FB}$ of the supply-current-dependent component $I_I$ is kept at a previously determined value of the feedback component $I_{I-FB}^P$ until the pushing force deviation $(F_S^*-F_S)$ becomes larger than the set deviation $\Delta F_{S0}$.

vi) Flow of Determining Target Supply Current

The determination of the target supply current I* is executed such that the computer 120 of the ECU 18 repeatedly executes a target supply current determining program indicated by a flowchart of FIG. 4 at a considerably short pitch, e.g., from several to several tens of milliseconds (msec). The flow of the determination of the target supply current I* will be hereinafter briefly explained by explaining processing according to the program.

In the processing according to the target supply current determining program, it is determined at Step 1 whether the required braking force $F_B^*$ based on the signal transmitted from the central ECU 126 is larger than 0, namely, whether the braking force request is made for the electric brake device. Step S1 is hereinafter abbreviated as "S1", and other steps are similarly abbreviated. When the braking force request is made, it is determined at S2 whether the braking force request is based on the brake operation of the driver. When it is determined that the braking force request is based on the brake operation, the control flow goes to S3 to determine whether the required braking force difference $\Delta F_B^*$, which is a difference between the required braking force $F_B^*$ at previous execution of the program and the required braking force $F_B^*$ at present execution of the program, is larger than the set difference $\Delta F_B^*_0$. That is, it is determined whether the degree of the required braking force change based on the brake operation of the driver of the vehicle is larger than the set degree.

When it is determined at S3 that the degree of the required braking force change based on the brake operation of the driver of the vehicle is larger than the set degree, namely, when it is determined at S3 that the braking-force generating state is the required-braking-force changing state, a determination process subroutine with increased contribution degree of the motor-rotation-speed-dependent component is executed at S4. As a result of execution of the subroutine, the target supply current I* is determined in a state in which the contribution degree of the motor-rotation-speed-dependent component $I_N$ is increased, as later explained in detail.

When it is determined at S3 that the degree of the required braking force change based on the brake operation of the vehicle of the driver is equal to or smaller than the set degree, namely, when it is determined at S3 that the braking-force generating state is the required-braking-force maintaining state, a determination process subroutine with increased contribution degree of the supply-current-dependent component is executed at S5. As a result of execution of the subroutine, the target supply current I* is determined in a state in which the contribution degree of the supply-current-dependent component $I_I$ is increased, as later explained in detail.

When the braking force request is not based on the brake operation, namely, in the case where the ABS control is being executed, in the case where the braking force request is made in response to a request for the automatic brake, or the like, a determination process subroutine with increased contribution degree of the pushing-force-dependent component is executed at S6. As a result of execution of the subroutine, the target supply current I* is determined in a state in which the contribution degree of the pushing-force-dependent component $I_F$ is increased, as later explained in detail.

On the other hand, when it is determined at S1 that the required braking force $F_B^*$ is 0, namely, when it is determined at S1 that the braking force request is not made, the control flow goes to S7 at which the feedforward component $I_{N-FF}$ and the feedback component $I_{N-FB}$ of the motor-rotation-speed-dependent component $I_N$, the feedforward component $I_{I-FF}$ and the feedback component $I_{I-FB}$ of the supply-current-dependent component $I_I$, and the feedforward component $I_{F-FF}$ and the feedback component $I_{F-FB}$ of the pushing-force-dependent component $I_F$ are made equal to 0, and the target supply current I* is determined to be equal to 0.

Figure 5:
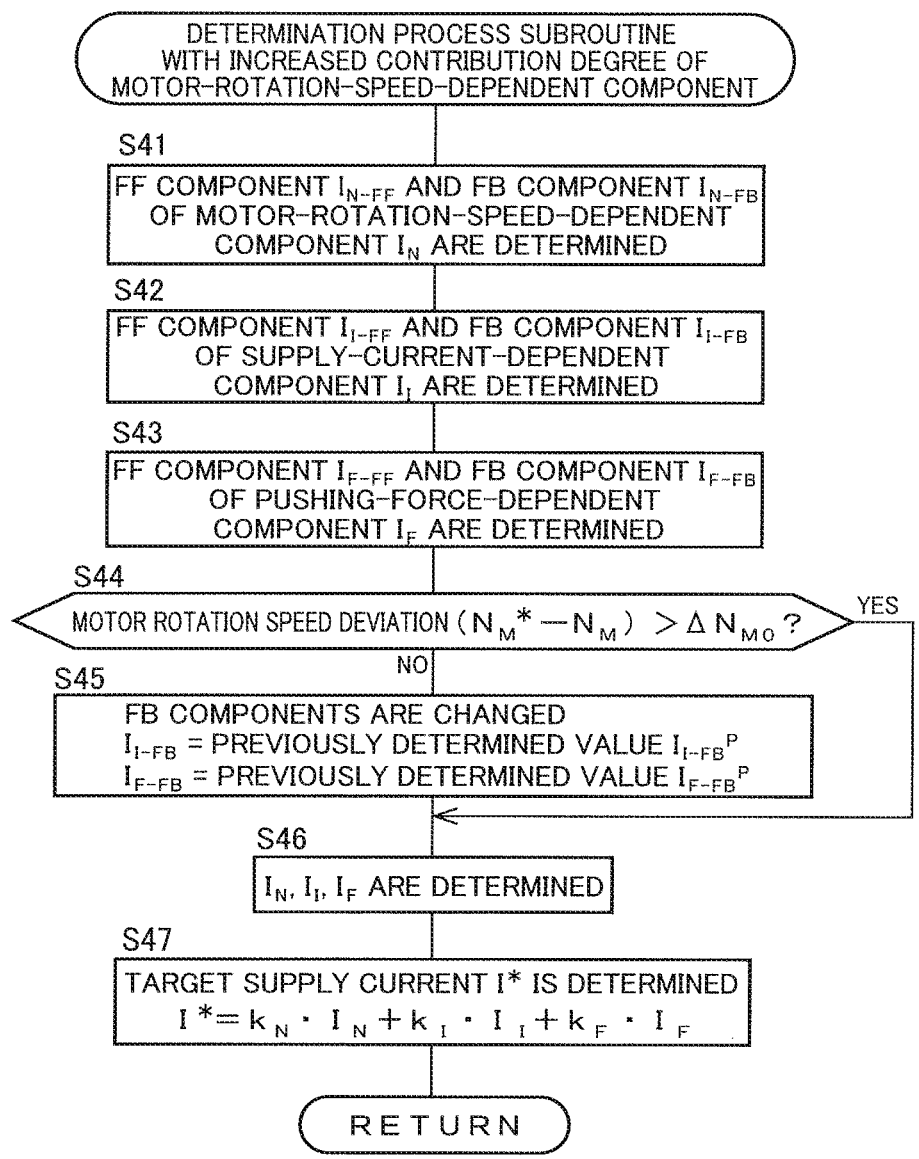
FIG. 5 is a flowchart indicating a determination process subroutine with increased contribution degree of a motor-rotation-speed-dependent component, the subroutine being executed in the target supply current determining program.

In the processing according to the determination process subroutine with increased contribution degree of the motor-rotation-speed-dependent component (S4) indicated by a flowchart of FIG. 5, the feedforward component $I_{N-FF}$ and the feedback component $I_{N-FB}$ of the motor-rotation-speed-dependent component $I_N$, the feedforward component $I_{I-FF}$ and the feedback component $I_{I-FB}$ of the supply-current-dependent component $I_I$, and the feedforward component $I_{F-FF}$ and the feedback component $I_{FB}$ of the pushing-force-dependent component $I_F$ are determined at S41-S43 according to the methods described above. In this respect, an actual motor rotation speed $N_M$ is obtained based on the signal from the resolver 84, and an actual electric current I being supplied to the electric motor 44 is obtained based on the signal from the inverter 122. Further, the pushing force $F_S$ being actually generated is obtained based on the signal from the axial-force sensor 86.

Subsequently, it is determined at S44 whether the motor rotation speed deviation $(N_M^*-N_M)$ is larger than the set deviation $\Delta N_{M0}$. When the motor rotation speed deviation $(N_M^*-N_M)$ is not larger than the set deviation $\Delta N_{M0}$, the control flow goes to S45 at which the feedback component $I_{I-FB}$ of the supply-current-dependent component $I_I$ and the feedback component $I_{F-FB}$ of the pushing-force-dependent component $I_F$ are changed and determined to be respectively equal to the previously determined values $I_{I-FB}^P$, $I_{F-FB}^P$ determined at previous execution of the program.

Subsequently, at S46, each of the motor-rotation-speed-dependent component $I_N$, the supply-current-dependent component $I_I$, and the pushing-force-dependent component $I_F$ is determined by adding the feedforward component and the feedback component determined as described above. At S47, the motor-rotation-speed-dependent component $I_N$, the supply-current-dependent component $I_I$, and the pushing-force-dependent component $I_F$ are added up using the motor rotation speed gain $k_N$, the supply current gain $k_I$, and the pushing force gain $k_F$, each as the weighting coefficient, so that the target supply current I* is determined.

For instance, in the increasing process of the required braking force $F_B^*$ such as when the driver starts depressing the brake pedal or when driver further depresses the brake pedal or in the decreasing process of the required braking force $F_B^*$ such as when the driver performs depression return of the brake pedal, the subroutine of FIG. 5 is executed, and the target supply current I* is determined in a state in which the contribution degree of the motor-rotation-speed-dependent component $I_N$ is increased. Thus, the electric brake device generates the braking force $F_B$ that adequately follows an increase or a decrease in the required braking force $F_B^*$.

Figure 6:
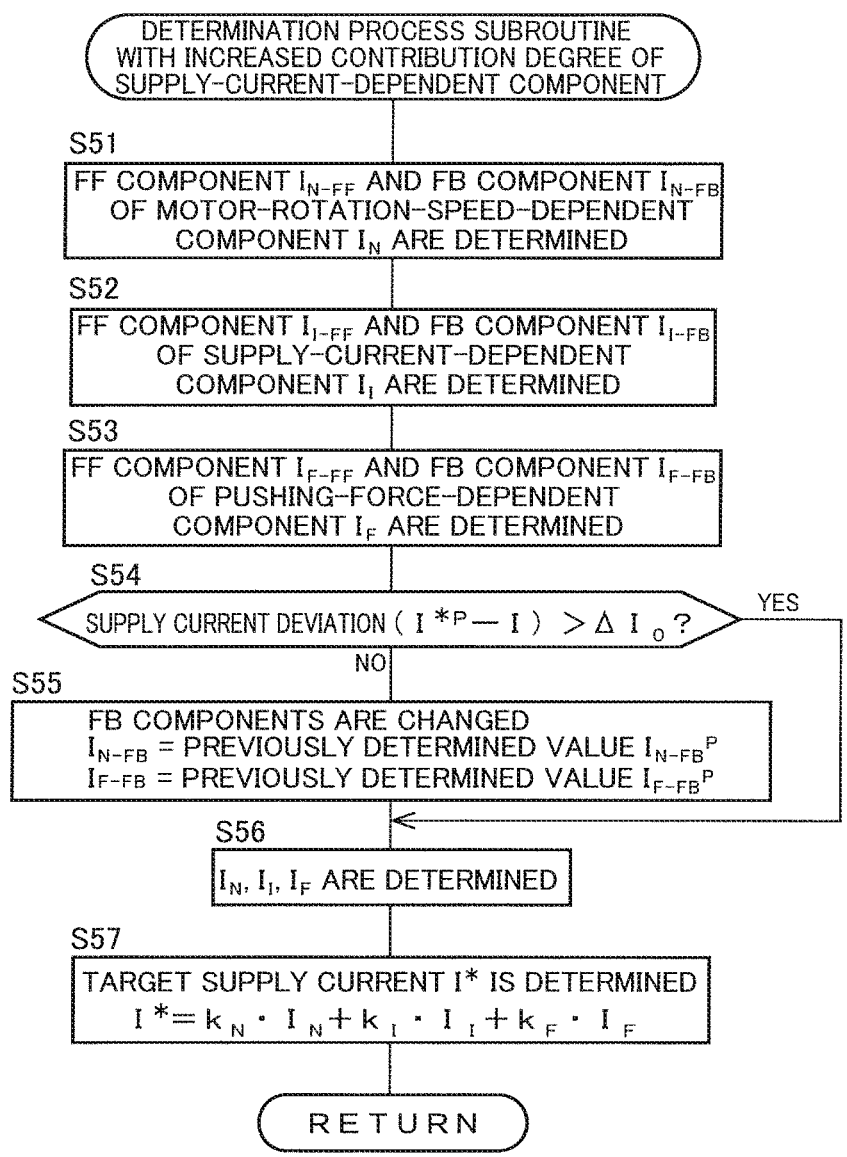
FIG. 6 is a flowchart indicating a determination process subroutine with increased contribution degree of a supply-current-dependent component, the subroutine being executed in the target supply current determining program.

The processing according to the determination process subroutine with increased contribution degree of the supply-current-dependent component (S5) indicated by a flowchart of FIG. 6 is constituted by S51-S57. However, S51-S57 are identical to S41-S47 of the processing according to the determination process subroutine with increased contribution degree of the motor-rotation-speed-dependent component except for S54, S55. Accordingly, only S54, S55 will be explained, and explanation of other steps is dispensed with.

At S54 corresponding to S44, it is determined whether the supply current deviation $(I^{*P}-I)$ is larger than the set deviation $\Delta I_0$. When the supply current deviation $(I^{*P}-I)$ is not larger than the set deviation $\Delta I_0$, the control flow goes to S55 corresponding to S45 at which the feedback component $I_{N-FB}$ of the motor-rotation-speed-dependent component $I_N$ and the feedback component $I_{F-FB}$ of the pushing-force-dependent component $I_F$ are changed and determined to be respectively equal to previously determined values $I_{N-FB}^P$, $I_{F-FB}^P$ determined at previous execution of the program.

The subroutine of FIG. 6 is executed in the case where the driver depresses the brake pedal and maintains the depressed position, and the target supply current I* is determined in a state in which the contribution degree of the supply-current-dependent component $I_I$ is increased. Thus, the electric brake device generates stable braking force $F_B$.

Figure 7:
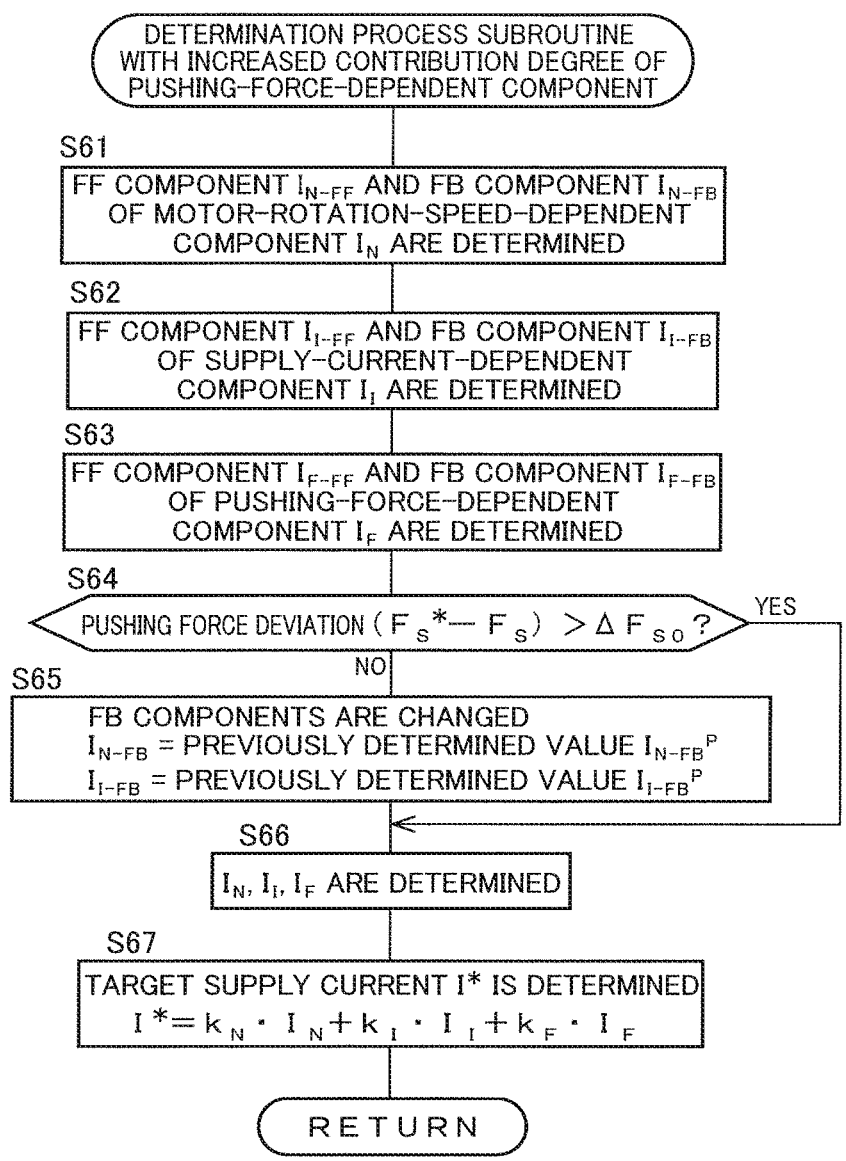
FIG. 7 is a flowchart indicating a determination process subroutine with increased contribution degree of a pushing-force-dependent component, the subroutine being executed in the target supply current determining program.

The processing according to the determination process subroutine with increased contribution degree of the pushing-force-dependent component (S6) indicated by a flowchart of FIG. 7 is constituted by S61-S67. However, S61-S67 are identical to S41-S47 of the processing according to the determination process with increased contribution degree of the motor-rotation-speed-dependent component except for S64, S65. Accordingly, only S64, S65 will be explained, and explanation of other steps is dispensed with.

At S64 corresponding to S44, it is determined whether the pushing force deviation $(F_S^*-F_S)$ is larger than the set deviation $\Delta F_{S0}$. When the pushing force deviation $(F_S^*-F_S)$ is not larger than the set deviation $\Delta F_{S0}$, the control flow goes to S65 corresponding to S45 at which the feedback component $I_{N-FB}$ of the motor-rotation-speed-dependent component $I_N$ and the feedback component $I_{I-FB}$ of the supply-current-dependent component $I_I$ are changed and determined to be respectively equal to previously determined values $I_{N-FB}^P$, $I_{I-FB}^P$ determined at previous execution of the program.

In the case where the ABS control starts, for instance, the subroutine of FIG. 7 is executed, and the target supply current I* is determined in a state in which the contribution degree of the pushing-force-dependent component $I_F$ is increased. Thus, the electric brake device generates the braking force $F_B$ whose magnitude is comparatively accurate.

vii) Functional Configuration of Controller

Figure 8:
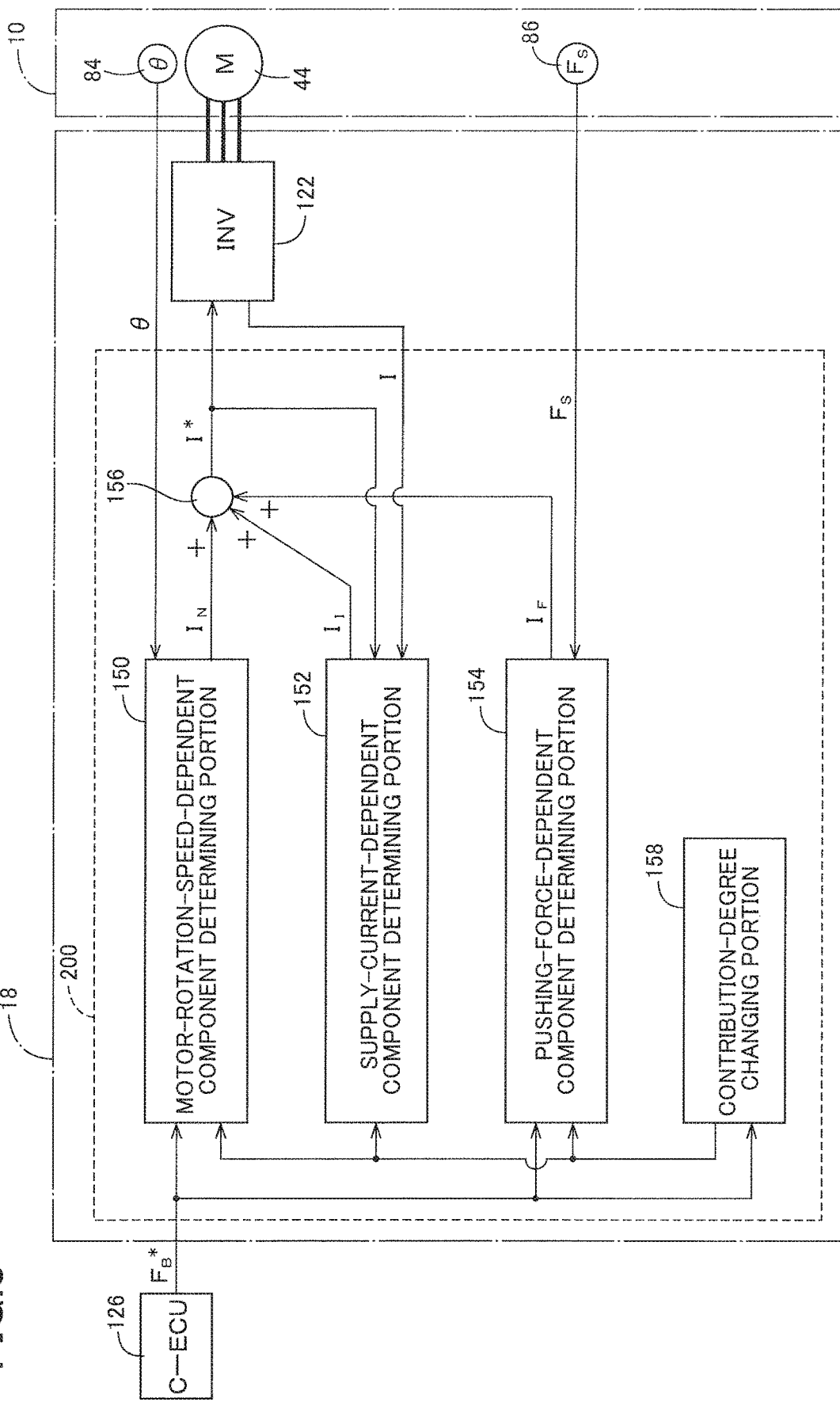
FIG. 8 is a block diagram showing a functional configuration of a controller of the electric brake device according to the embodiment.

The ECU 18 as the controller, specifically, the computer 120 of the ECU 18, is considered as including a functional configuration illustrated by a block diagram of FIG. 8 by execution of the target supply current determining program explained above. In other words, the ECU 18 may be considered as including functional portions described below.

A motor-rotation-speed-dependent component determining portion 150 is a functional portion constituted by the processing at S41, S51, S61 and a part of the processing at S46, S56, S66 of the three subroutines of the target supply current determining program. A supply-current-dependent component determining portion 152 is a functional portion constituted by the processing at S42, S52, S62 and a part of the processing at S46, S56, S66. A pushing-force-dependent component determining portion 154 is a functional portion constituted by the processing at S43, S53, S63 and a part of the processing at S46, S56, S66. An adder 156 is a functional portion constituted by the processing at S47, S57, S67.

A contribution-degree changing portion 158 for changing the contribution degrees of the motor-rotation-speed-dependent component $I_N$, the supply-current-dependent component $I_I$, and the pushing-force-dependent component $I_F$ is a functional portion which is configured to determine which one of the three subroutines is to be executed based on the determinations at S1-S3 and which is constituted by the processing at S44-S45, S54-S55, or S64-S65 of the determined subroutine.

Modification

An electric brake device according to a modification differs from the electric brake device according to the illustrated embodiment only in the way to change the contribution degrees of the motor-rotation-speed-dependent component $I_N$, the supply-current-dependent component $I_I$, and the pushing-force-dependent component $I_F$ in the determination of the target supply current I*. Accordingly, the electric brake device according to the modification will be explained focusing only on the way to change the contribution degrees.

In the electric brake device according to the illustrated embodiment, the feedback components of two of the three components other than the high contribution-degree component are kept at the respective fixed values, whereby the contribution degrees of the respective components are changed in accordance with the characteristic of the braking force $F_B$ to be generated. In the electric brake device according to the modification, the three components are determined according to the principle, and the weighting coefficients of the respective three components, i.e., the motor rotation speed gain $k_N$, the supply current gain $k_I$, and the pushing force gain $k_F$, are changed in adding up of the three components according to the above formula (20). That is, the weights assigned to the respective components are changed to thereby change the contribution degrees thereof.

Specifically, a large value $k_{N\text{-}MA}$ and a small value $k_{N\text{-}MI}$ are set for the motor rotation speed gain $k_N$, a large value $k_{I\text{-}MA}$ and a small value $k_{I\text{-}MI}$ are set for the supply current gain $k_I$, and a large value $k_{F\text{-}MA}$ and a small value $k_{F\text{-}MI}$ are set for the pushing force gain $k_F$. It is determined which one of the large value and the small value is employed for each of the motor rotation speed gain $k_N$, the supply current gain $k_I$, and the pushing force gain $k_F$, in accordance with the characteristic of the braking force $F_B$ to be generated.

Specifically, in the case where the braking-force generating state is the required-braking-force changing state, the motor rotation speed gain $k_N$ is set to the large value $k_{N\text{-}MA}$, and the supply current gain $k_I$ and the pushing force gain $k_F$ are respectively set to the small value $k_{I\text{-}MI}$ and the small value $k_{F\text{-}MI}$ as indicated by the following formula (22), so as to increase the contribution degree of the motor-rotation-speed-dependent component $I_N$. That is, the motor-rotation-speed-dependent component $I_N$ is more largely weighted than the supply-current-dependent component $I_I$ and the pushing-force-dependent component $I_F$. In other words, the weight assigned to the motor-rotation-speed-dependent component $I_N$ is larger than those assigned to the supply-current-dependent component $I_I$ and the pushing-force-dependent component $I_F$. In the case where the braking-force generating state is the required-braking-force maintaining state, the supply current gain $k_I$ is set to the large value $k_{I\text{-}MA}$, and the motor rotation speed gain $k_N$ and the pushing force gain $k_F$ are respectively set to the small value $k_{N\text{-}MI}$ and the small value $k_{F\text{-}MI}$ as indicated by the following formula (23), so as to increase the contribution degree of the supply-current-dependent component $I_I$. That is, the supply-current-dependent component $I_I$ is more largely weighted than the motor-rotation-speed-dependent component $I_N$ and the pushing-force-dependent component $I_F$. In other words, the weight assigned to the supply-current-dependent component $I_I$ is larger than those assigned to the motor-rotation-speed-dependent component $I_N$ and the pushing-force-dependent component $I_F$. In the case where the braking-force generating state is the non-brake-operation braking force requesting state, the pushing force gain $k_F$ is set to the large value $k_{F\text{-}MA}$, and the motor rotation speed gain $k_N$ and the supply current gain $k_I$ are respectively set to the small value $k_{N\text{-}MI}$ and the small value $k_{I\text{-}MI}$ as indicated by the following formula (24), so as to increase the contribution degree of the pushing-force-dependent component $I_F$. That is, the pushing-force-dependent component $I_F$ is more largely weighted than the motor-rotation-speed-dependent component $I_N$ and the supply-current-dependent component $I_I$. In other words, the weight assigned to the pushing-force-dependent component $I_F$ is larger than those assigned to the motor-rotation-speed-dependent component $I_N$ and the supply-current-dependent component $I_I$. It is noted that the relationship indicated by the above formula (21) holds also in the electric brake device according to the modification.

$$k_F = k_{F\text{-}MI}, \ k_N = k_{N\text{-}MA}, \ k_I = k_{I\text{-}MI} \quad (22)$$

$$k_F = k_{F\text{-}MI}, \ k_N = k_{N\text{-}MI}, \ k_I = k_{I\text{-}MA} \quad (23)$$

$$k_F = k_{F\text{-}MA}, \ k_N = k_{N\text{-}MI}, \ k_I = k_{I\text{-}MI} \quad (24)$$

Each of the motor rotation speed gain $k_N$, the supply current gain $k_I$, and the pushing force gain $k_F$ is set so as to be gradually changed toward the large value or toward the small value to obviate, in the switching of the braking-force generating state from one of the three states to another, an abrupt change in the braking force $F_B$ being generated. That is, the weights are changed so as to be gradually changed. Specifically, the weights are changed by a set gradual change value Δk for every execution of the target supply current determining program. In this respect, the set gradual change value Δk is determined to be a value that permits each gain to reach one of the large value and the small value from the other of the large value and the small value by several to several tens of times of execution of the program.

A target supply current determining program executed in the electric brake device according to the modification (hereinafter referred to as "target supply current determining program of the modification" where appropriate) differs from the target supply current determining program executed in the electric brake device according to the illustrated embodiment (hereinafter referred to as "target supply current determining program of the embodiment" where appropriate) in the three subroutines executed at S4, S5, S6, i.e., the determination process subroutine with increased contribution degree of the motor-rotation-speed-dependent component, the determination process subroutine with increased contribution degree of the supply-current-dependent component, and the determination process subroutine with increased contribution degree of the pushing-force-dependent component.

Figure 9:
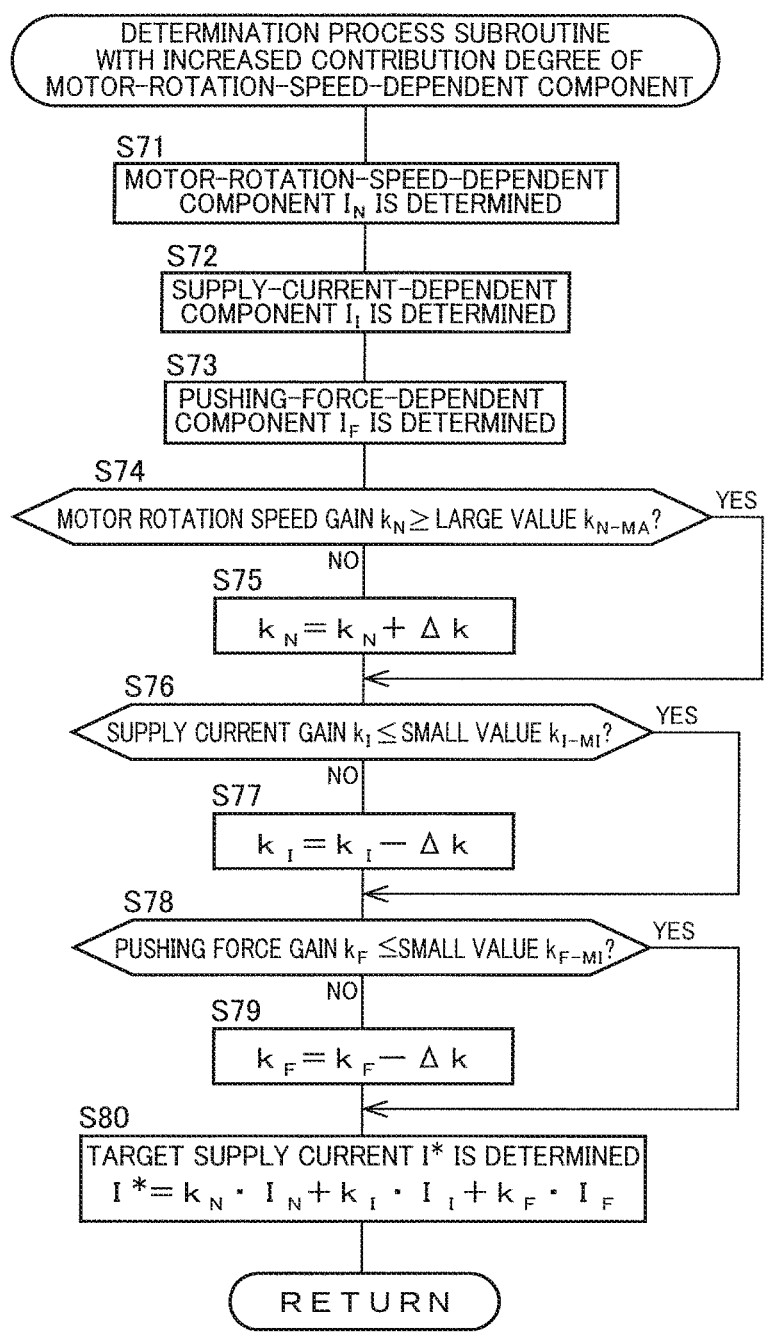
FIG. 9 is a flowchart indicating a determination process subroutine with increased contribution degree of the motor-rotation-speed-dependent component, the subroutine being executed in a target supply current determining program executed in an electric brake device according to a modification.

In the target supply current determining program of the modification, the determination process subroutine with increased contribution degree of the motor-rotation-speed-dependent component is indicated by a flowchart of FIG. 9. In the subroutine, the motor-rotation-speed-dependent component $I_N$, the supply-current-dependent component $I_I$, and the pushing-force-dependent component $I_F$ are determined at S71-S73 according to the methods explained above. At S74-S79, the motor rotation speed gain $k_N$, the supply current gain $k_I$, and the pushing force gain $k_F$ are adjusted. Specifically, the motor rotation speed gain $k_N$ is gradually increased up to the large value $k_{N\text{-}MA}$ in the case where the motor rotation speed gain $k_N$ is not equal to the large value $k_{N-MA}$, the supply current gain $k_I$ is gradually decreased down to the small value $k_{I-MI}$ in the case where the supply current gain $k_I$ is not equal to the small value $k_{I-MI}$, and the pushing force gain $k_F$ is gradually decreased down to the small value $k_{F-MI}$ in the case where the pushing force gain $k_F$ is not equal to the small value $k_{F-MI}$. At S80, the target supply current I* is determined based on: the motor rotation speed gain $k_N$, the supply current gain $k_I$, and the pushing force gain $k_F$ that are adjusted as described above; and the motor-rotation-speed-dependent component $I_N$, the supply-current-dependent component $I_I$, and the pushing-force-dependent component $I_F$ that are determined as described above.

Figure 10:
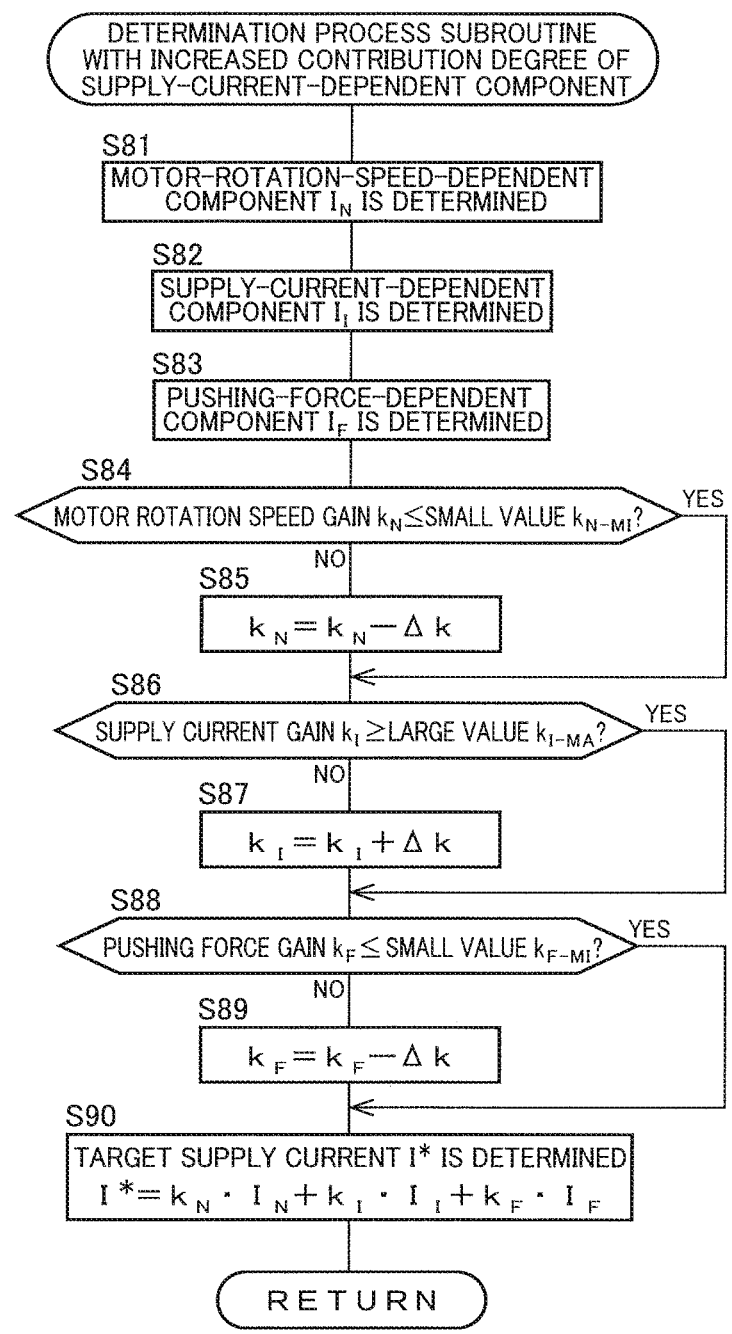
FIG. 10 is a flowchart indicating a determination process subroutine with increased contribution degree of the supply-current-dependent component, the subroutine being executed in the target supply current determining program executed in the electric brake device according to the modification.

In the target supply current determining program of the modification, the determination process subroutine with increased contribution degree of the supply-current-dependent component is indicated by a flowchart of FIG. 10. In the subroutine, the motor-rotation- speed-dependent component $I_N$, the supply-current-dependent component $I_I$, and the pushing-force-dependent component $I_F$ are determined at S81-S83 according to the methods explained above. At S84-S89, the motor rotation speed gain $k_N$, the supply current gain $k_I$, and the pushing force gain $k_F$ are adjusted. Specifically, the motor rotation speed gain $k_N$ is gradually decreased down to the small value $k_{N-mi}$ in the case where the motor rotation speed gain $k_N$ is not equal to the small value $k_{N-mi}$, the supply current gain $k_I$ is gradually increased up to the large value $k_{I-MA}$ in the case where the supply current gain $k_I$ is not equal to the large value $k_{I-MA}$, and the pushing force gain $k_F$ is gradually decreased down to the small value $k_{F-MI}$ in the case where the pushing force gain $k_F$ is not equal to the small value $k_{F-MI}$. At S90, the target supply current I* is determined based on: the motor rotation speed gain $k_N$, the supply current gain $k_I$, and the pushing force gain $k_F$ that are determined as described above; and the motor-rotation-speed-dependent component $I_N$, the supply-current-dependent component $I_I$, and the pushing-force-dependent component $I_F$ that are determined as described above.

Figure 11:
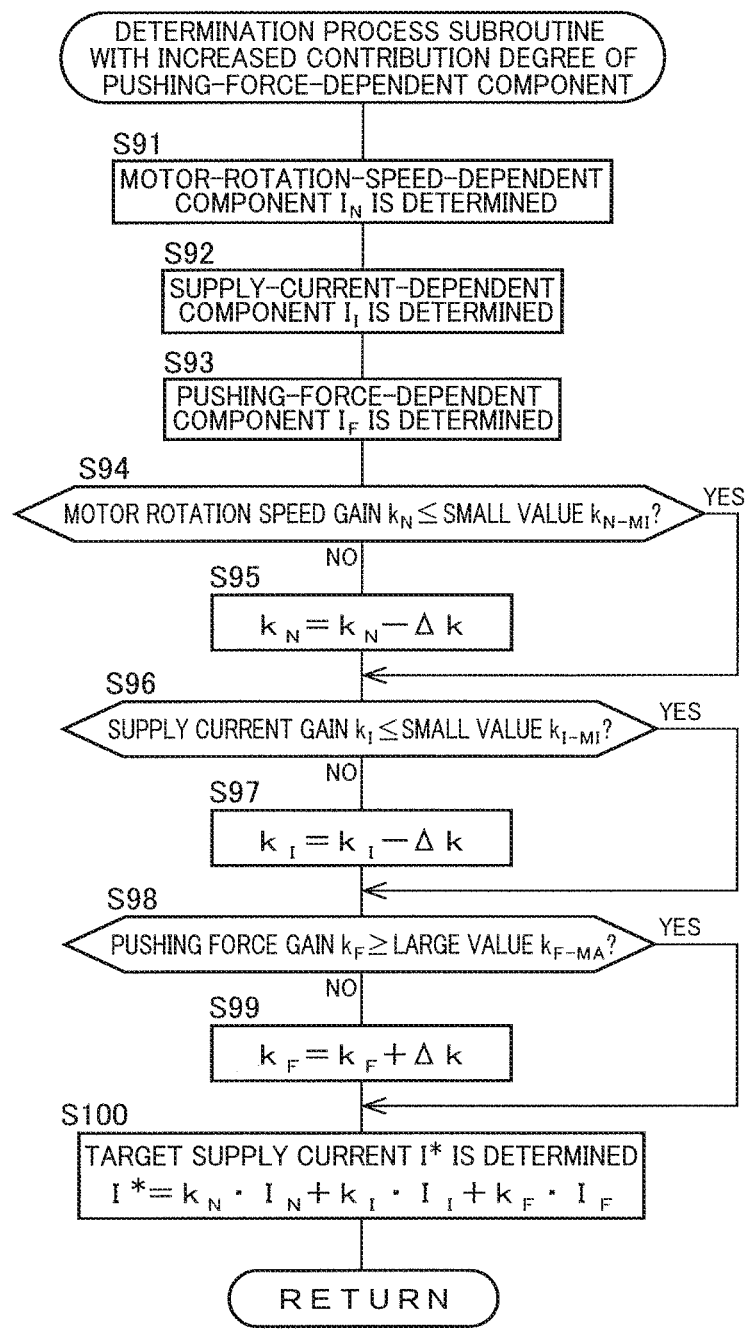
FIG. 11 is a flowchart indicating a determination process subroutine with increased contribution degree of the pushing-force-dependent component, the subroutine being executed in the target supply current determining program executed in the electric brake device according to the modification.

In the target supply current determining program according to the modification, the determination process subroutine with increased contribution degree of the pushing-force-dependent component is indicated by a flowchart of FIG. 11. In the subroutine, the motor-rotation-speed-dependent component $I_N$, the supply-current-dependent component $I_I$, and the pushing-force-dependent component $I_F$ are determined at S91-S93 according to the methods explained above. At S94-S99, the motor rotation speed gain $k_N$, the supply current gain $k_I$, and the pushing force gain $k_F$ are adjusted. Specifically, the motor rotation speed gain $k_N$ is gradually decreased down to the small value $k_{N-MI}$ in the case where the motor rotation speed gain $k_N$ is not equal to the small value $k_{N-MI}$, the supply current gain $k_I$ is gradually decreased down to the small value $k_{I-MI}$ in the case where the supply current gain $k_I$ is not equal to the small value $k_{I-MI}$, and the pushing force gain $k_F$ is gradually increased up to the large value $k_{F-MA}$ in the case where the pushing force gain $k_F$ is not equal to the large value $k_{F-MA}$. At, S100, the target supply current I* is determined based on: the motor rotation speed gain $k_N$, the supply current gain $k_I$, and the pushing force gain $k_F$ that are adjusted as described above; and the motor-rotation-speed-dependent component $I_N$, the supply-current-dependent component $I_I$, and the pushing-force-dependent component $I_F$ that are determined as described above.

Advantageous effects offered by execution of the target supply current determining program of the modification are similar to those offered by execution of the target supply current determining program of the embodiment, and a detailed explanation thereof is dispensed with.

The ECU 18 as the controller of the electric brake device according to the modification, specifically, the computer 120 of the ECU 18, has a functional configuration illustrated in FIG. 8 similar to that in the electric brake device according to the illustrated embodiment. The motor-rotation-speed-dependent component determining portion 150 is a functional portion constituted by the processing at S71, S81, S91 of the three subroutines in the target supply current determining program of the modification. The supply-current-dependent component determining portion 152 is a functional portion constituted by the processing at S72, S82, S92. The pushing-force-dependent component determining portion 154 is a functional portion constituted by the processing at S73, S83, S93. Further, the adder 156 is a functional portion constituted by the processing at S80, S90, S100. The contribution-degree changing portion 158 for changing the contribution degrees of the motor-rotation-speed-dependent component $I_N$, the supply-current-dependent component $I_I$, and the pushing-force-dependent component $I_F$ is a functional portion configured to determine which one of the three subroutines is to be executed based on the determinations at S1-S3 and constituted by the processing at S74-S79, S84-S89, or S94-S99 of the determined subroutine.

What is claimed is:

1. An electric brake device installed on a vehicle, comprising:
    a rotary body to rotate with a wheel;
    a friction member to be pushed onto the rotary body;
    an actuator including an electric motor as a drive source to cause the friction member to be pushed onto the rotary body; and
    a controller to control a braking force generated by the electric brake device by controlling a supply current supplied to the electric motor,
    wherein the controller determines, by mutually different methods, a plurality of target supply current components each of which is a component of a target supply current as a target of the supply current, determines the target supply current by adding up the target supply current components, and changes contribution degrees of the respective target supply current components in the determination of the target supply current in accordance with a characteristic of the braking force to be generated,
    wherein the target supply current components include:
        a motor-rotation-speed-dependent component including a feedback component based on a motor rotation speed deviation that is a deviation of an actual rotation speed of the electric motor from a target motor rotation speed as a target of a rotation speed of the electric motor; and
        a supply-current-dependent component including a feedback component based on a supply current deviation that is a deviation of an actual supply current from the target supply current.

2. The electric brake device according to claim 1,
    wherein the braking force required to be generated by the electric brake device is defined as a required braking force and a change in the required braking force is defined as a required braking force change,
    wherein the controller increases the contribution degree of the motor-rotation-speed-dependent component in the determination of the target supply current when a degree of the required braking force change based on a brake operation by a driver of the vehicle becomes larger than a set degree, and wherein the controller increases the contribution degree of the supply-current-dependent component in the determination of the target supply current when the degree of the required braking force change based on the brake operation by the driver of the vehicle becomes equal to or smaller than the set degree.

3. The electric brake device according to claim 2, wherein the controller increases the contribution degree of the motor-rotation-speed-dependent component in the determination of the target supply current by keeping the feedback component of the supply-current-dependent component at a fixed value until the motor rotation speed deviation becomes larger than a set deviation, and wherein the controller increases the contribution degree of the supply-current-dependent component in the determination of the target supply current by keeping the feedback component of the motor-rotation-speed-dependent component at a fixed value until the supply current deviation becomes larger than a set deviation.

4. The electric brake device according to claim 2, wherein the controller determines the target supply current by adding up the motor-rotation-speed-dependent component and the supply-current-dependent component after weights are assigned to the motor-rotation-speed-dependent component and the supply-current-dependent component, wherein the controller increases the contribution degree of the motor-rotation-speed-dependent component in the determination of the target supply current by changing the weights such that the motor-rotation-speed-dependent component is more largely weighted than the supply-current-dependent component, and wherein the controller increases the contribution degree of the supply-current-dependent component in the determination of the target supply current by changing the weights such that the supply-current-dependent component is more largely weighted than the motor-rotation-speed-dependent component.

5. The electric brake device according to claim 4, wherein the weights are changed so as to be gradually changed.

6. The electric brake device according to claim 1, wherein the target supply current components further include a pushing-force-dependent component including a feedback component based on a pushing force deviation that is a deviation of an actual pushing force from a target pushing force as a target of a pushing force by which the friction member is pushed onto the rotary body by the actuator.

7. The electric brake device according to claim 6, wherein the braking force required to be generated by the electric brake device is defined as a required braking force and a change in the required braking force is defined as a required braking force change, wherein the controller increases the contribution degree of the motor-rotation-speed-dependent component in the determination of the target supply current when a degree of the required braking force change based on a brake operation by a driver of the vehicle becomes larger than a set degree, wherein the controller increases the contribution degree of the supply-current-dependent component in the determination of the target supply current when the degree of the required braking force change based on the brake operation by the driver of the vehicle becomes equal to or smaller than the set degree, and wherein the controller increases the contribution degree of the pushing-force-dependent component in the determination of the target supply current when a braking force request not based on the brake operation by the driver of the vehicle is made.

8. The electric brake device according to claim 7, wherein the controller increases the contribution degree of the motor-rotation-speed-dependent component in the determination of the target supply current by keeping the feedback components of the supply-current-dependent component and the pushing-force-dependent component at respective fixed values until the motor rotation speed deviation becomes larger than a set deviation, wherein the controller increases the contribution degree of the supply-current-dependent component in the determination of the target supply current by keeping the feedback components of the motor-rotation-speed-dependent component and the pushing-force-dependent component at respective fixed values until the supply current deviation becomes larger than a set deviation, and wherein the controller increases the contribution degree of the pushing-force-dependent component in the determination of the target supply current by keeping the feedback components of the motor-rotation-speed-dependent component and the supply-current-dependent component at respective fixed values until the pushing force deviation becomes larger than a set deviation.

9. The electric brake device according to claim 7, wherein the controller determines the target supply current by adding up the motor-rotation-speed-dependent component, the supply-current-dependent component, and the pushing-force-dependent component after weights are assigned to the motor-rotation-speed-dependent component, the supply-current-dependent component, and the pushing-force-dependent component, wherein the controller increases the contribution degree of the motor-rotation-speed-dependent component in the determination of the target supply current by changing the weights such that motor-rotation-speed-dependent component is more largely weighted than the supply-current-dependent component and the pushing-force-dependent component, wherein the controller increases the contribution degree of the supply-current-dependent component in the determination of the target supply current by changing the weights such that the supply-current-dependent component is more largely weighted than the motor-rotation-speed-dependent component and the pushing-force-dependent component, and wherein the controller increases the contribution degree of the pushing-force-dependent component in the determination of the target supply current by changing the weights such that the pushing-force-dependent component is more largely weighted than the motor-rotation-speed-dependent component and the supply-current-dependent component.

10. The electric brake device according to claim 9, wherein the weights are changed so as to be gradually changed.

* * * * *